US012810389B2

(12) United States Patent
Aggarwal et al.

(10) Patent No.: US 12,810,389 B2
(45) Date of Patent: Nov. 24, 2026

(54) CUSTOM IMAGE AND CONCEPT COMBINER USING DIFFUSION MODELS

(71) Applicant: Adobe Inc., San Jose, CA (US)

(72) Inventors: Pranav Aggarwal, San Jose, CA (US); Midhun Harikumar, San Jose, CA (US); Hareesh Ravi, San Jose, CA (US); Ajinkya Kale, San Jose, CA (US)

(73) Assignee: Adobe Inc., San Jose, CA (US)

( * ) Notice: Subject to any disclaimer, the term of this patent is extended or adjusted under 35 U.S.C. 154(b) by 225 days.

(21) Appl. No.: 18/595,096

(22) Filed: Mar. 4, 2024

(65) Prior Publication Data

US 2025/0278816 A1 Sep. 4, 2025

(51) Int. Cl.
*G06T 5/50* (2006.01)

(52) U.S. Cl.
CPC ...... *G06T 5/50* (2013.01); *G06T 2207/20081* (2013.01); *G06T 2207/20221* (2013.01)

(58) Field of Classification Search
CPC ............. G06T 5/50; G06T 2207/20081; G06T 2207/20221; G06T 5/60; G06T 5/70
See application file for complete search history.

(56) References Cited

U.S. PATENT DOCUMENTS 11,321,542 B2 * 5/2022 Kalchbrenner ......... G06F 40/44
11,463,455 B1 * 10/2022 Huang ................ H04L 63/1416
11,720,942 B1 * 8/2023 Bazzani ............. G06Q 30/0613 705/26.41
11,922,550 B1 * 3/2024 Ramesh .................. G06T 11/60
12,300,007 B1 * 5/2025 Levner ................. G06V 10/761
2017/0344822 A1 * 11/2017 Popescu ................. G06N 20/00
2018/0053042 A1 * 2/2018 Philbin .................. G06N 3/084
2019/0286708 A1 * 9/2019 Kalchbrenner ......... G06F 40/44
2020/0311798 A1 * 10/2020 Forsyth ..................... G06N 3/04
2021/0216862 A1 * 7/2021 Liu .......................... G06N 3/09
2022/0036127 A1 * 2/2022 Lin ......................... G06T 11/00
2022/0222235 A1 * 7/2022 Menghani ........... G06F 16/2282
2022/0292685 A1 * 9/2022 Heisler ................ G06N 3/0895
2023/0128637 A1 * 4/2023 Kouris ...................... G06T 7/12 382/173
2023/0154161 A1 * 5/2023 Pham ..................... G06N 3/045 382/156

(Continued)

OTHER PUBLICATIONS

Shen Y, Zhang Y, Zhai S, Huang L, Susskind JM, Gu J. Many-to-many image generation with auto-regressive diffusion models. arXiv preprint arXiv:2404.03109. Apr. 3, 2024.*

(Continued)

*Primary Examiner* — Sarah Lhymn
(74) *Attorney, Agent, or Firm* — FIG. 1 Patents

(57) ABSTRACT

Techniques for generation of images based on a variety of input conditions or modalities are described. In one embodiment, one or more processing devices receive a plurality of input modalities comprising multiple images and a text input in a natural language. The processing devices generate image embeddings for the multiple images and a text embedding for the text input. The processing devices, using a machine learning model, generate an output image based on the image embeddings and the text embedding. The output image includes portions of the multiple images.

20 Claims, 16 Drawing Sheets

(56) References Cited

U.S. PATENT DOCUMENTS

| | | | | |
|---|---|---|---|---|
| 2023/0222628 | A1* | 7/2023 | Zhao | G06V 10/82 382/156 |
| 2023/0281999 | A1* | 9/2023 | Schulter | G06V 20/54 382/159 |
| 2024/0020578 | A1* | 1/2024 | Lee | G06N 3/096 |
| 2024/0029868 | A1* | 1/2024 | Gulsun | G16H 30/40 |
| 2024/0037347 | A1* | 2/2024 | Lee | G06F 40/47 |
| 2024/0070868 | A1* | 2/2024 | Yu | G06V 10/273 |
| 2024/0095534 | A1* | 3/2024 | Anandkumar | G06N 3/08 |
| 2024/0104305 | A1* | 3/2024 | Glesinger | G06V 10/421 |
| 2024/0161250 | A1* | 5/2024 | Balaji | G06T 5/70 |
| 2024/0169662 | A1* | 5/2024 | Sajjadi | G06T 15/205 |
| 2024/0249456 | A1* | 7/2024 | Saharia | G06T 11/60 |
| 2024/0256824 | A1* | 8/2024 | Singh | G06N 3/084 |
| 2024/0282084 | A1* | 8/2024 | Serra | G06T 7/0012 |
| 2024/0282094 | A1* | 8/2024 | Tsimpoukelli | G06V 10/82 |
| 2024/0320872 | A1* | 9/2024 | Hinz | G06F 40/40 |
| 2024/0320909 | A1* | 9/2024 | Deng | G06T 17/00 |
| 2024/0331237 | A1* | 10/2024 | Ramesh | G06T 11/60 |
| 2024/0378874 | A1* | 11/2024 | Schulter | G06V 10/7715 |
| 2024/0386049 | A1* | 11/2024 | Agrawal | G06F 40/20 |
| 2025/0085826 | A1* | 3/2025 | Cano | G06F 3/0481 |
| 2025/0104309 | A1* | 3/2025 | Qu | G06F 40/30 |
| 2025/0117893 | A1* | 4/2025 | Steiner | G06T 5/60 |
| 2025/0148752 | A1* | 5/2025 | Vishnukumar Sharmini | G06V 30/148 |
| 2025/0148759 | A1* | 5/2025 | Minderer | G06V 10/776 |
| 2025/0166837 | A1* | 5/2025 | Agu | G06V 10/74 |
| 2025/0245791 | A1* | 7/2025 | Yan | G06T 5/70 |
| 2025/0259406 | A1* | 8/2025 | Kumar | G06T 19/20 |
| 2025/0356611 | A1* | 11/2025 | Schmidt | G06V 10/25 |

OTHER PUBLICATIONS huggingface.co, "Image Mixer," Lambda Cloud, Jan. 2023, 3 pages. [online source] URL: https://huggingface.co/spaces/lambdalabs/image-mixer-demo.

huggingface.co, "AutoencoderKL", Hugging Face, 10 pages. [online source] URL: https://huggingface.co/docs/diffusers/api/models/autoencoderkl.

huggingface.co, "T5," Hugging Face, Jan. 4, 2022, 44 pages. [online source] URL: https://huggingface.co/docs/transformers/model_doc/t5.

github.com, "DALL-E2—Pytorch," lucidrains, Implementation of DALL-E 2, Apr. 2022, 21 pages. [online soure] URL: https://github.com/lucidrains/DALLe2-pytorch.

arxiv.org, "Controlled and Conditional Text to Image Generation with Diffusion Prior," arxiv, Cornell University, Feb. 2023, 4 pages. [online source] URL: https://arxiv.org/abs/2302.11710.

International Search Report and Written Opinion for International Application No. PCT/US2024/025853, mailed on Dec. 10, 2024, 16 pages.

Tseng Hung-Yu et al., "RetrieveGAN: Image Synthesis via Differentiable Patch Retrieval," 16th European Conference, Aug. 23-28, 2020, Proceedings, Part VIII, Jul. 16, 2020 (Jul. 16, 2020), pp. 1-21.

Chengyang Zhao, "TextPSG: Panoptic Scene Graph Generation from Textual Descriptions," Cornell University Library, arXiv:2310.07056v1, Oct. 10, 2023 (Oct. 10, 2023), 17 pages.

Yikang Li et al., "PasteGAN: A Semi—Parametric Method to Generate Image from Scene Graph," arXiv:1905.01608v2, Cornell University Library, 33rd Conference on Neural Information Processing Systems, May 5, 2019 (May 5, 2019), 11 pages.

* cited by examiner

CUSTOM IMAGE AND CONCEPT COMBINER USING DIFFUSION MODELS

BACKGROUND

Image generation is a complex computing process that combines computer vision and natural language processing (NLP) techniques to analyze and understand visual information. Various machine learning and/or artificial intelligence models are trained on large amounts of visual data, such as images or videos, and textual descriptions to learn the relationship between visual and linguistic information. The models enable machines to understand and describe visual content in natural language, which is useful in various domains, including e-commerce, social media, and healthcare. However, existing computing systems are limited in their capacities to generate images that incorporate multiple input modalities in accordance with specific intentions of the users.

SUMMARY

Exemplary embodiments are generally directed to artificial intelligence (AI) and machine learning (ML) (AI/ML) techniques suitable for training and generation of images based on a variety of input conditions or modalities.

In some embodiments, the current subject matter relates to a system for training a machine learning (ML) model to generate images. The ML model includes a diffusion model, a generative model, and/or any other model. The system trains the ML model using various input modalities. The modalities include images, text, image concept instructions, image structure instructions, etc. In particular, the system trains the ML model using a reference image and one or more randomly generated portions of the reference image portions, as well as text input/prompt and/or prompt. The system includes one or more respective encoders that receive the reference image, randomly generated portions (e.g., image crops) of the reference image, and text input. The encoders include image processing encoders, text processing encoders, and/or any other types of encoders capable of processing input data. The image encoders generate image embeddings as well as embeddings for the randomly generated image portions. The text encoders generate text embeddings. Other encoders process any additional input to generate respective embeddings. The system then iteratively trains the ML model using the generated embeddings. Throughout training, the system uses the embeddings to semantically arrange randomly generated image portions in accordance with the structure of the reference image so that the ML model learns to generate the reference image.

In some embodiments, once the ML model is trained, the system uses the trained ML model to generate images based on various inputs during an inference phase. During such phase, the system receives same type of input modalities, e.g., images, portions of images, image concept instructions (e.g., background, settings, etc.), image structure instructions (e.g., arrangement of objects in the output image), text, etc. The system then feeds the received inputs into respective encoders. For example, image encoders receive image inputs and generate image embeddings. Text encoders receive text inputs and generate text embeddings. Other types of encoders process other inputs to generate their respective embeddings. The system then provides all generated embeddings to the trained ML model. The trained ML model uses the embeddings as instructions to generate an output image. The model may access various databases to retrieve images and/or graphical elements that may be identified in the embeddings to generate the output image.

Other embodiments are described and claimed.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
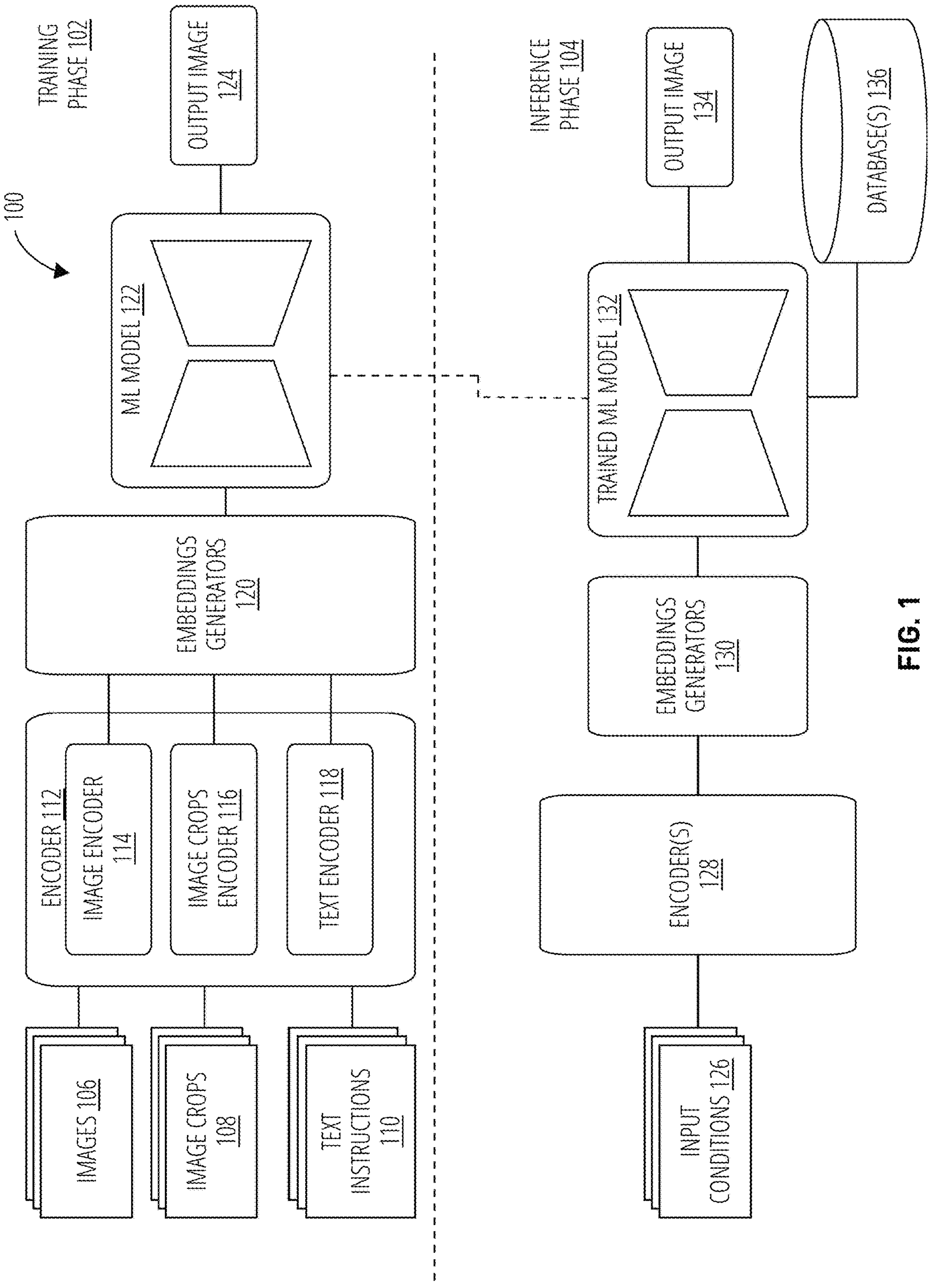
FIG. 1 illustrates an example image generation system, according to some embodiments of the current subject matter

The recent introduction of large-scale visual language models pre-trained on web-scale data enables many new vision tasks. Examples of pre-trained such models include contrastive language-image pre-training (CLIP), vision transformer (ViT), data-efficient image transformer (DeiT), universal image-text representation learning (UNITER), object-semantics aligned pre-training (OSCAR), aligning images and natural language (ALIGN), among others. These pre-trained models provide a multimodal vision-language representation suitable for a number of downstream tasks, such as zero-shot classification and retrieval, image/video generation, language-guided question answering, image captioning, robotic manipulation, and other vision tasks. Such models can be used for generation of images.

Many existing image generation systems rely on textual inputs to generate images. The inputs may include images that a design may wish to combine as well as describe reference images in the form of descriptive textual prompts. The images and textual prompts are then used to generate images. However, the generated images typically are not sufficiently detailed, do not fit the visual designer's requirements or needs, do not include representation of portions of one image versus another image, contain lower quality overall color and style distribution that does not match that of the reference images, as well as suffer from other problems.

Some existing systems train a stable diffusion model on multiple CLIP image embeddings. During a training phase, the systems concatenate image crop embeddings together and send those as conditioning to the model. During an inference phase, multiple image embeddings are concatenated and sent to the model to generate a mix of all images into a single image. However, this system is limited to training a model with images only. Hence, there is no other control of the final output through use of other inputs, such as, text, structure guidance, etc.

In some embodiments, the current subject matter solves the above issues by providing an ability to control generation of output images through use of combination of inputs. In particular, output images are generated using a trained machine learning (ML) model, e.g., a diffusion model, a generative model (e.g., U-NET model—a convolutional neural network developed by the University of Freiburg, Germany), using various input modalities, which include different images and text input instructions. In the training phase, the ML model is trained using a reference image and randomly generated reference image portions as well as text input and/or prompt. Reference image, randomly generated reference image portions, and text input (i.e., modalities) are fed into respective separate encoders (e.g., an autoencoder, a T5 encoder, a CLIP encoder, etc.) to generate embeddings. The embeddings are then used to iteratively train the ML model. Throughout training, embeddings are used to semantically arrange reference image portions in accordance with its structure to generate the reference image.

The image embeddings include a reference image embedding and one or more image portions embeddings. The image portions embeddings are generated using the reference image. The image portions embeddings are generated using randomly generated image portions of the reference image (e.g., crops of the reference image). Each image portion can have its size, which can also be randomly determined. During the training phase, the reference image embedding and the image portions embeddings are converted into a uniform dimension. This allows the ML model to process the images and the image portions.

To ensure that the ML model is trained using image and text input modalities, the current subject matter uses also trains the ML model using text inputs. In particular, similar to generation of image embeddings, the current subject matter system generate text embeddings based on a text input and provides them to the ML model. The system then trains the ML model using the image embeddings and the text embeddings. During training, the system semantically arranges the image portions of the reference image using the structure of the reference image and the text input. Moreover, in some example embodiments, the system assigns one or more weights to each of the image embeddings and the text embeddings. Each weight is associated with a probability of not using a respective one or more image embeddings and the text embedding during the training.

In the inference phase, same types of input modalities (e.g., images, portions of images, and various text) are provided into the above respective encoders, which, in turn, generate embeddings. The trained ML model uses the embeddings to generate an output image, which combines various aspects of the input modalities. Similar to the training phase, the current subject matter system, after generating image, text, and/or any other embeddings, provides the embeddings to the trained ML model, which, in turn, generate an output image.

The current subject matter has various technical benefits. In particular, the current subject matter provides an ability to control content of output images generated by the trained ML model. This is accomplished by using a combination of different types of input modalities during training and inference, which the existing systems are not capable of. Use of reference images, their portions and text inputs that relate to the structure of the reference image enables producing a higher accuracy trained ML model. Specific guidance, during inference, to such trained ML model, e.g., providing of different images and textual instructions and requesting the trained ML to generate a desired output image in accordance with the images/textual instructions, allows users creative control of particulars of output images.

FIG. 1 illustrates an example image generation system 100, according to some embodiments of the current subject matter. The image generation system 100 trains a machine learning (ML) model using various multi-modal inputs (e.g., images, text, etc.). The system 100 further uses such trained ML model to generate images in accordance with other multi-modal inputs.

To generate images, the system 100 includes one or more encoders, one or more embeddings generators, and an ML model. It operates in two phases: a training phase 102 and an inference phase 104. During the training phase 102, the system 100, which includes one or more encoders 112, one or more embeddings generators 120, and machine learning (ML) model 122, trains the ML model 122 to generate an output image 124 in accordance with one or more inputs. The inputs include one or more images 106, one or more image crops 108, and/or one or more text instructions 110.

During the inference phase 104, the system 100, which includes one or more encoder(s) 128, one or more embeddings generators 130, and the trained ML model 132. The trained ML model 132 is the ML model 122 that has been trained during the training phase 102. The encoder(s) 128 can be same or similar to the encoders 112 used during the training phase 102.

The encoders 112 and/or 128 can include one or more image encoders (e.g., a CLIP encoder, an autoencoder, etc.) and one or more text encoders (e.g., a T5 encoder, a PRIOR encoder), and/or any other encoders. Each type (e.g., image, text) of encoder can process their respective data and provide it, in the form of embeddings, to the ML model for training, during the training phase 102, and for image generation, during the inference phase 104.

In some example embodiments, one or more components of the system 100 may include any combination of hardware and/or software. In some embodiments, one or more components of the system 100 may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system 100 may be disposed on a single computing device and/or may be part of a single communications network. Alternatively, or in addition to, such services may be separately located from one another. A service may be a computing processor, a memory, a software functionality, a routine, a procedure, a call, and/or any combination thereof that may be configured to execute a particular function associated with the current subject matter lifecycle orchestration service(s).

In some embodiments, the system 100's one or more components may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system 100 also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 100 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the functions described herein. One or more components of the system 100 may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, touchscreen, microphone, digital camera, video recorder or camcorder. These devices may be used to enter information and interact with the software and other devices described herein.

In some example embodiments, one or more components of the system 100 may execute one or more applications, such as software applications, that enable, for example, network communications with one or more components of system 100 and transmit and/or receive data.

One or more components of the system 100 may include and/or be in communication with one or more servers via one or more networks and may operate as a respective front-end to back-end pair with one or more servers. One or more components of the system 100 may transmit, for example, from a mobile device application (e.g., executing on one or more user devices, components, etc.), one or more requests to one or more servers. The requests may be associated with retrieving data from servers. The servers may receive the requests from the components of the system 100. Based on the requests, servers may be configured to retrieve the requested data from one or more databases. Based on receipt of the requested data from the databases, the servers may be configured to transmit the received data to one or more components of the system 100, where the received data may be responsive to one or more requests.

The system 100 may include one or more networks. In some embodiments, networks may be one or more of a wireless network, a wired network or any combination of wireless network and wired network and may be configured to connect the components of the system 100 and/or the components of the system 100 to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 702.11b, 702.15.1, 702.11n and 702.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 702.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, and home networks.

The system 100 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system 100.

One or more components of the system 100 may be configured to execute one or more transactions using one or more containers. In some embodiments, each transaction may be executed using its own container. A container may refer to a standard unit of software that may be configured to include the code that may be needed to execute the action along with all its dependencies. This may allow execution of actions to run quickly and reliably.

Figure 2:
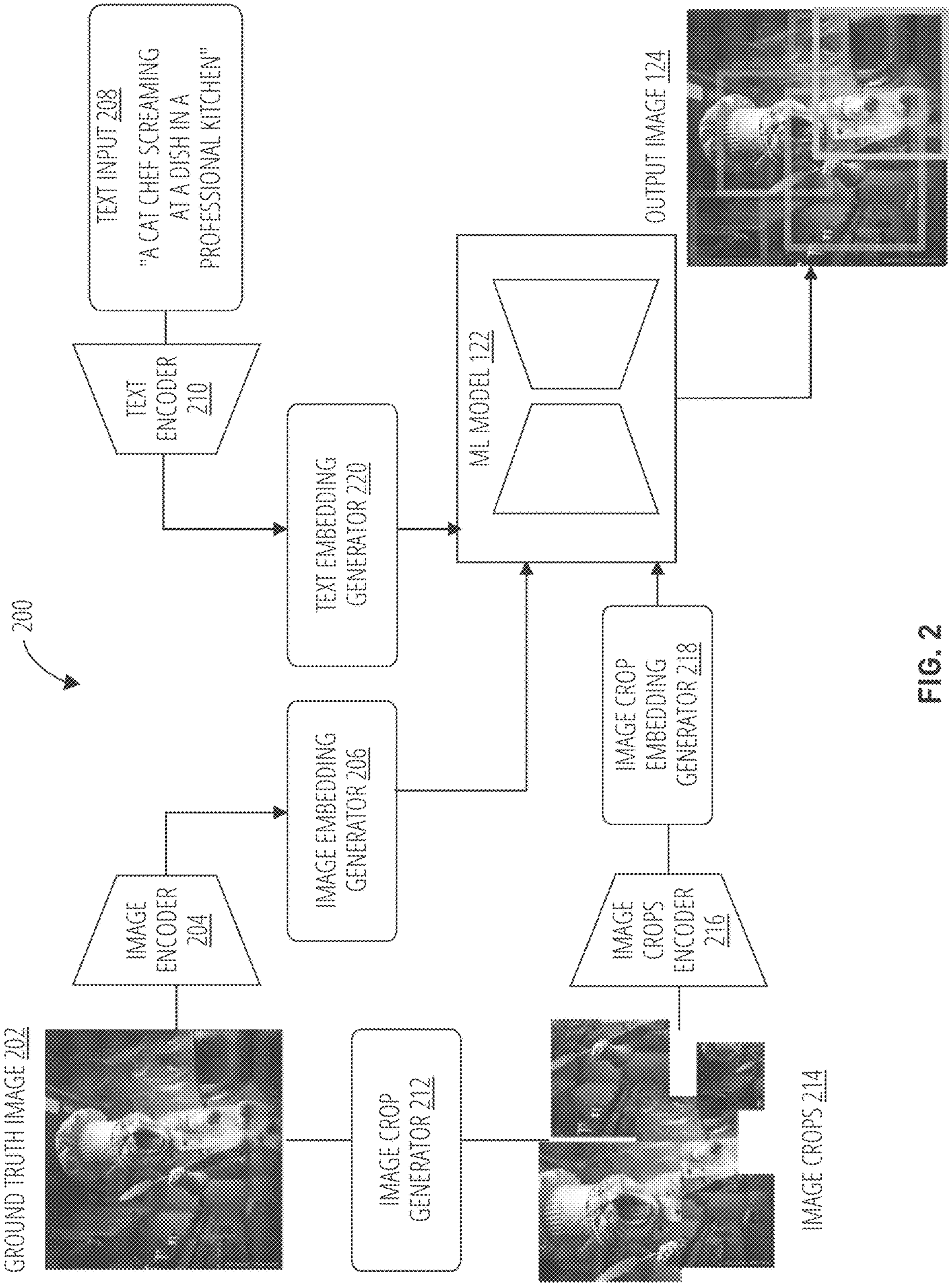
FIG. 2 illustrates an example training system, according to some embodiments of the current subject matter.

As shown in FIG. 1, during the training phase 102, the encoder 112 receive one or more images 106, one or more image crops 108 (which may be randomly generated using images 106), one or more text instructions 110 (as shown in FIG. 2, for example), and/or any other inputs, prompts, etc., where embeddings generators 120 then generate separate embeddings for the images 106, the image crops 108, the text instructions 110, and/or any other inputs. The image crops 108 are generated using one or more images 106. In some embodiments, the image crops are randomly generated.

Each of the image and/or image crops embeddings is a vector or numerical representation. In one embodiment, the vector is a fixed-length numerical representation of an image that captures its visual features and characteristics in a high-dimensional vector space. The fixed length is typically determined by the architecture of the CNN used to generate the image embeddings. For example, in a CLIP model, the image embedding is a 512-dimensional vector that represents the content and visual features of the input image. This means that the image encoder (e.g., image encoder 114 and/or image crops encoder 116) maps an input image to a vector with a fixed length of 512 elements, regardless of the size or complexity of the input image. The image encoder (e.g., image encoder 114 and/or image crops encoder 116) normalizes each image embedding to have a unit length. This allows measurement of a distance between images, using measurement techniques such as cosine similarity between vectors, a Euclidean distance between two vectors, dot product, or any other suitable algorithm to measure a semantic similarity between images. The CLIP model, developed by OpenAI, is a large-scale, pre-trained deep learning model that learns from image-text pairs. It leverages a contrastive learning approach to simultaneously learn to generate image and text embeddings in a shared latent space. The model is trained on a diverse set of internet images and their associated textual descriptions. This pre-training process enables the CLIP model to learn a wide range of visual and textual concepts, which is fine-tuned for various downstream tasks. Operations for the image encoder (e.g., image encoder 114 and/or image crops encoder 116) are discussed in more detail with reference to FIG. 6.

In parallel and/or prior to and/or after the operation of the image encoder, the text encoder (e.g., text encoder 118) receives text (e.g., text instructions 110) as input. The text input may include text information in a natural language form, such as, for example, a written, a spoken, etc. form. The spoken language may be captured from audio signals, which are then translated to text form using a speech-to-text (STT) model.

The text encoder extracts text features from the raw text data through a process called feature extraction. Feature extraction typically involves several pre-processing operations on the raw text data, such as tokenization, stemming, and stop word removal, which varies depending on the specific task and dataset. Examples of text features include word frequencies, sentence structure, semantic content, and other textual features from the personal transcript.

The text encoder creates one or more text embeddings. Similar to the image embeddings, the text embeddings are fixed-size vector representations of the extracted text features or characteristics for a given textual description. The text encoder creates the text embeddings by passing text input (e.g., words, sentences, paragraphs, etc.) through a transformer-based neural network, such as, for example, generative pre-trained transformer (GPT), bidirectional encoder representations from transformers (BERT), etc. The transformer-based neural network is trained to encode natural language text into the text embeddings. The text encoder uses the transformer-based network to encode the input text into a sequence of numerical vectors, which are then aggregated into a fixed-length text embedding through pooling operations, such as average pooling or max pooling. The fixed-length of the text embeddings matches the fixed-length of the image embeddings. For example, in CLIP, the text embedding is a 512-dimensional vector that represents the semantic content and textual features of the input personal transcript.

The text encoder is trained to produce text embeddings that are semantically meaningful and transferable across different tasks and datasets. The text encoder achieves this through a contrastive learning objective, where the text encoder is trained to produce text embeddings that are similar to the image embeddings of its associated image, and dissimilar to the image embeddings of other images. This forces the text embeddings to capture the semantic content of the text and align it with the visual features of the image, enabling tasks such as text-based image retrieval. Operations for the text encoder are discussed in more detail with reference to FIG. 7.

During the inference phase 104, the system 100 receives one or more input conditions or modalities (used interchangeably herein) 126, provides them to one or more encoder(s) 128 to generate one or more embeddings, which the embeddings generators 130 provide to the trained ML model 132 to generate an output image 134. The input conditions 126 can include various input modalities, such as, for example, images, text, structural guidance, concept guidance, scaling factors (e.g., which may influence whether a specific aspect of the input is enhanced/reduced in the output image 134). The encoders encoder(s) 128 can include any encoders that can process images, text, etc. to generate one or more embeddings that can be provided to the 132 by the respective embedding generators 318.

In some embodiments, the system 200 also includes one or more database(s) 136 that the 132 can access during generation of the output image 134. The database(s) 136 can store a multiple images, each of which can be specifically labeled, tagged, and/or identified (e.g., an image containing a speedboat may be labeled as "speedboat") to allow the trained ML model 132 to query and retrieve appropriate image and/or portion thereof during generation of the output image 134. Upon receiving embeddings reflecting a specific input (e.g., structure defining a specific object to be present in the image), the trained ML model 132 queries the database(s) 136 to retrieve an image of corresponding to the input. For example, an input stating "man sitting in the speedboat" causes the trained ML model 132 to query the database(s) 136 to retrieve an image of a speedboat. As can be understood, the trained ML model 132 can obtain data, images, and/or any other information from any desired source in any desired way.

FIG. 2 illustrates an example training system 200, according to some embodiments of the current subject matter. The system 200 trains the ML model 122 during the training phase 102 shown in FIG. 1. To train the ML model 122, the system 200 uses an image encoder 204 (similar to the image encoder 114 shown in FIG. 1), a text encoder 210 (similar to the text encoder 118 shown in FIG. 1), and an image crops encoder 216 (similar to the image crops encoder 116 shown in FIG. 1). ML model 122 can include any diffusion model (e.g., U-NET), a generative model, and/or any other type of model.

The image encoder 204 (e.g., an autoencoder and/or any other encoder) is communicatively coupled to an image embedding generator 206, where the image encoder 204 and the generator 206 generate one or more image embeddings based on a ground truth image 202. The image encoder 204 receives the ground truth image 202. The image 202 shows a screaming cat wearing a chef's hat and standing in a professional kitchen holding a utensil. The image encoder 204 analyzes the structure of the image to determine its specific structural features, e.g., "a screaming cat", "a cat wearing a chef's hat", a "professional kitchen", "a cat standing in a professional kitchen", "a cat holding a utensil", etc. The encoder 204 then uses structural features to generate one or more image embeddings having a predetermined dimension. The image embeddings are resized (e.g., by the image embedding generator 206) to ensure that all inputs that are provided to the ML model 122 for training have uniform dimension. For example, the image encoder 204 generates latents of size 8×32×32, which are resized to 8×1024. The latents have structural information of the ground truth image 202 (e.g., as shown in FIG. 2, cat in a chef's hat holding a utensil and standing in professional kitchen). As can be understood, any desired dimensions can be used by the system 200 in connection with generating and/or resizing dimensions of embeddings provided to the ML model (either during training and/or during inferencing). The generator 206 then provides the image embeddings to the ML model 122 for training.

The text encoder 210 (e.g., a T5 encoder, a CLIP encoder, etc.) is communicatively coupled to a text embedding generator 220, where the text encoder 210 and the generator 220 generate one or more text embeddings based on a text input and/or prompt (terms may be used interchangeably herewith) 208. The text input 208 can describe one or more specific features related to the ground truth image 202. For example, the text input 208 states "a cat chef screaming at a dish in a professional kitchen." Similar to the processing performed by the image encoder 204, the text encoder 210 generates one or more text embeddings (as discussed herein) having a predetermined dimension. The text embeddings are resized (e.g., by the text embedding generator 220) to ensure that all inputs that are provided to the ML model 122 for training have uniform dimension. The generator 220 then provides the text embeddings to the ML model 122 for training.

The image crops encoder 216 receives one or more image crops 214 generated by the image crop generator 212 using the ground truth image 202. The image crops encoder 216 is communicatively coupled to an image crop embedding generator 218, where the image crops encoder 216 and the generator 218 generate one or more image crops embeddings based on image crops 214. This allows the system 200 to train the ML model 122 to generate images using multiple images as input conditions (with/without text input condition), where the images are semantically placed to form a single image, which is different from globally mixing images together. One or more of the above inputs and/or input conditions and/or prompts may be used to form a training dataset that may be used for training the ML model 122. As can be understood, each and/or any combination of input(s), input condition(s), prompt(s), etc. may be a separate training dataset and/or multiple training dataset.

To do so, the system 200 trains the ML model 122 using a distribution P $(I|X_{crops}, Y, Z)$, where $X_{crops}{}^{n\times1024}$ represents n number of image crop embeddings (e.g., as generated by the CLIP encoder based on image crops 214) and $Z^{8\times1024}$ represents the ground truth image (e.g., ground truth image 202) being passed to image encoder 204 (e.g., an autoencoder) and used as a third input modality condition. In some non-limiting, example embodiments, the system 200 uses 5-10 image crops 214 to train the ML model 122. As can be understood, the system 200 may use any number of image crops (e.g., image crops 214) to train the ML model 122. Moreover, in some embodiments, during training phase 102, the system 200 can be configured to randomly remove image crops embeddings (e.g., make image crops embedding equal to a 0 vector) at random positions to enable the ML model 122 to work using varied number of image crops provided during the inference phase 104.

Additionally, to ensure that the ML model 122 is properly trained to handle different scenarios during the inference phase 104, the system 200, and in particular, its image crop generator 212, dynamically and randomly generates different sizes of the image crops. This way, the ML model 122 becomes more efficient at identifying and semantically scaling objects contained in image crops and using them to generate images. In some example, non-limiting embodiments, the image crop generator 212 generates image crops having sizes in the range of ¼ to ¾ area of the ground truth image 202. As can be understood, the image crop generator 212 can generate image crops having any desired size vis-a-vis the ground truth image 202. Once the image crop embeddings are generated (which may be executed many times), the generator 218 provides the image crops embeddings to the ML model 122 for training.

Moreover, in some embodiments, the system 200 trains the ML model 122 to generate images using any other types of inputs in addition to the images, image crops, text, etc. For example, these inputs can relate to an overall structure of an output image that can be controlled using a reference image, one or more scaling factors, etc.

Upon receiving the image embeddings, the text embeddings, the image crops embeddings from the respective generators 206, 220, and 218, and/or any other inputs, the system 200 iteratively trains the ML model 122. During the training, the ML model 122 is conditioned to model a distribution P $(I|X, Y)$, where I denotes a 128×128 RGB image, $X \in R^{1024}$ is the ground truth image embedding (e.g., as generated by image encoder 204 (e.g., CLIP encoder)) and $Y \in R^{128\times1024}$ is a text embedding (e.g., as generated by text encoder 210 (e.g., T5 encoder)). The system 200 first iteratively trains ML model 122 using this distribution (e.g., using millions of iterations). Once the ML model 122 has learnt efficiently to generate images based on either text and/or image as conditions to the ML model, the system 200 performs finetuning of the model.

Further, during the training phase 102, the system 200 passes the image embeddings, the image crop embeddings and/or the text embeddings through a projection layer, which changes their respective dimensions to n×2048 (e.g., $X_{crops}{}^{n\times2048}$ for image crops embeddings and $Z^{8\times2048}$ for image embeddings). In some embodiments, a total number of tokens that the system 200 passes to the ML model 122 can be limited. For example, the system 200 passes 128 tokens corresponding to text embeddings, 5 tokens for image embeddings, and 8 tokens for image crops embeddings for a total of 141 tokens. As can be understood, the system 200 can pass any number of tokens to the ML model during training and/or inference phases.

In some embodiments, during finetuning of the ML model 122, the system 200 distributes or assigns one or more attention weights to one or more of the input modalities (i.e., image embeddings, image crops embeddings, and/or text embeddings). Any desired weights may be assigned. Moreover, when some of the input modalities are not provided to the ML model 122 (e.g., image and image crops embeddings are provided and text embeddings are not provided), the system 200 assigns different drop probabilities to compensate for absence of input modalities and to ensure generation of quality outputs by the ML model. For example, the system 200 can assign a drop probability of 0.25 to the text embeddings, 0.25 drop probability to the image embeddings, and 0.65 to image crops embeddings. As can be understood, any desired drop probabilities can be used.

Figure 3:
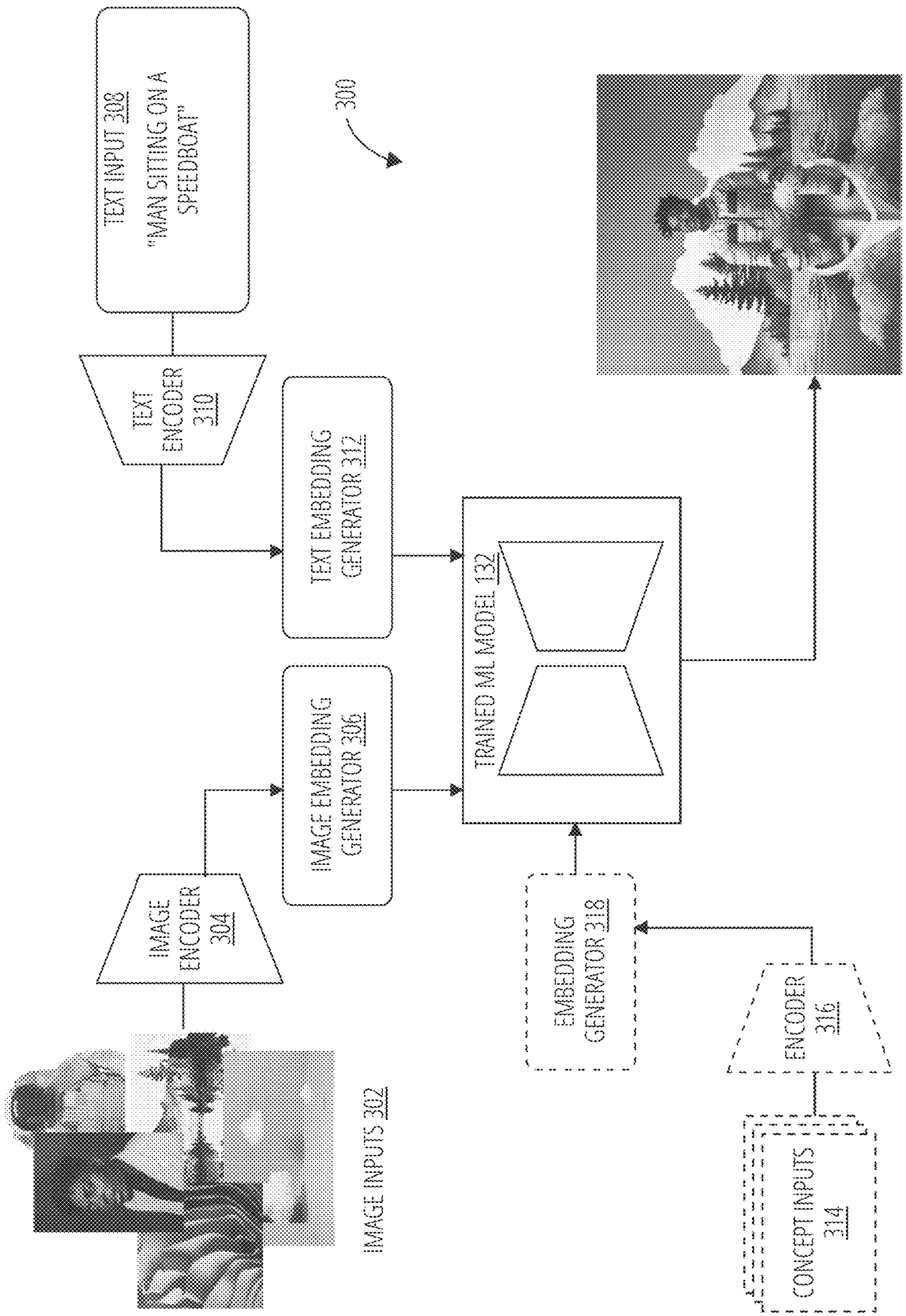
FIG. 3 illustrates an example inferencing system for generation of one or more images, according to some embodiments of the current subject matter.
Figure 4:
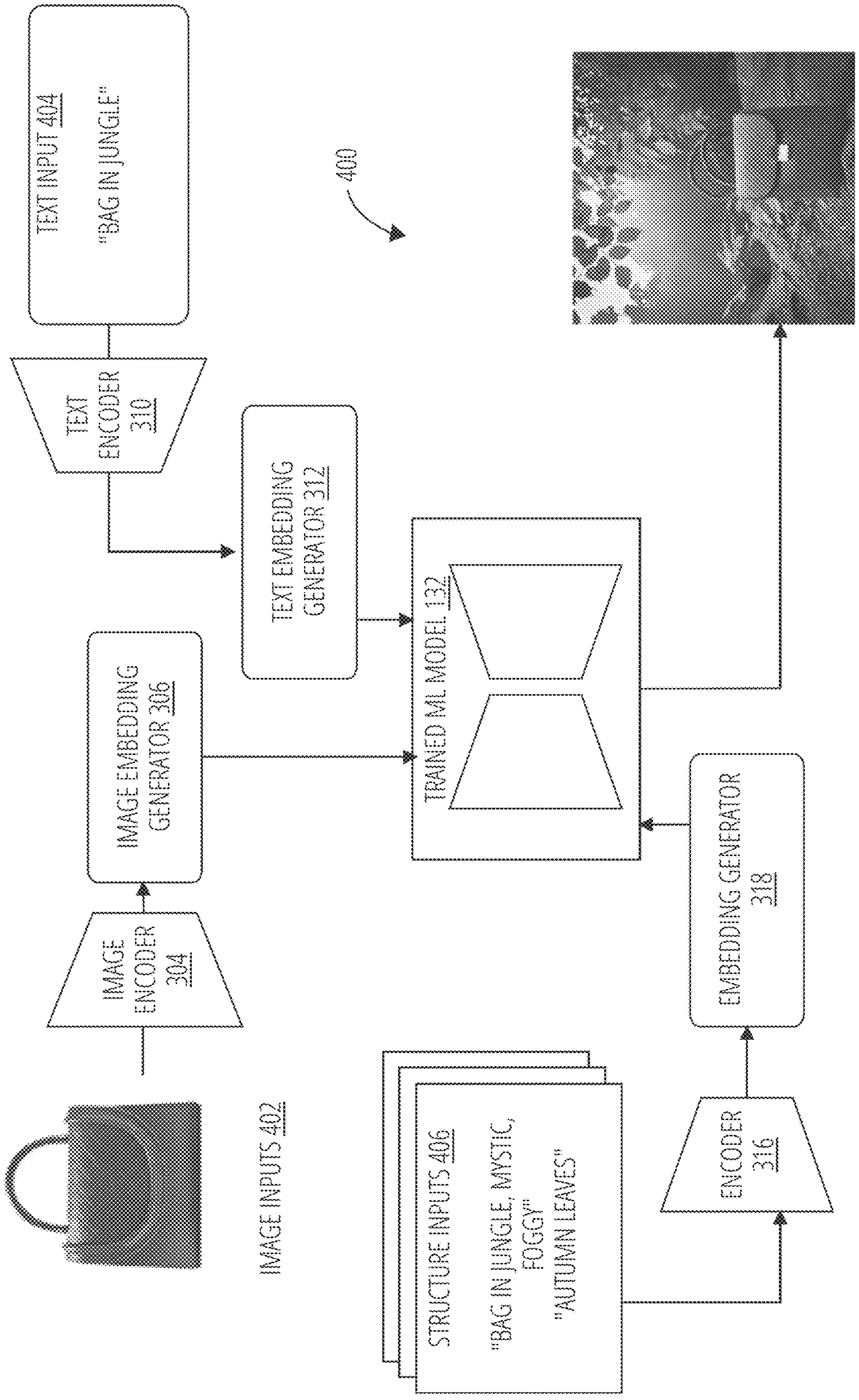
FIG. 4 illustrates another example inferencing system for generation of one or more images, according to some embodiments of the current subject matter.
Figure 5:
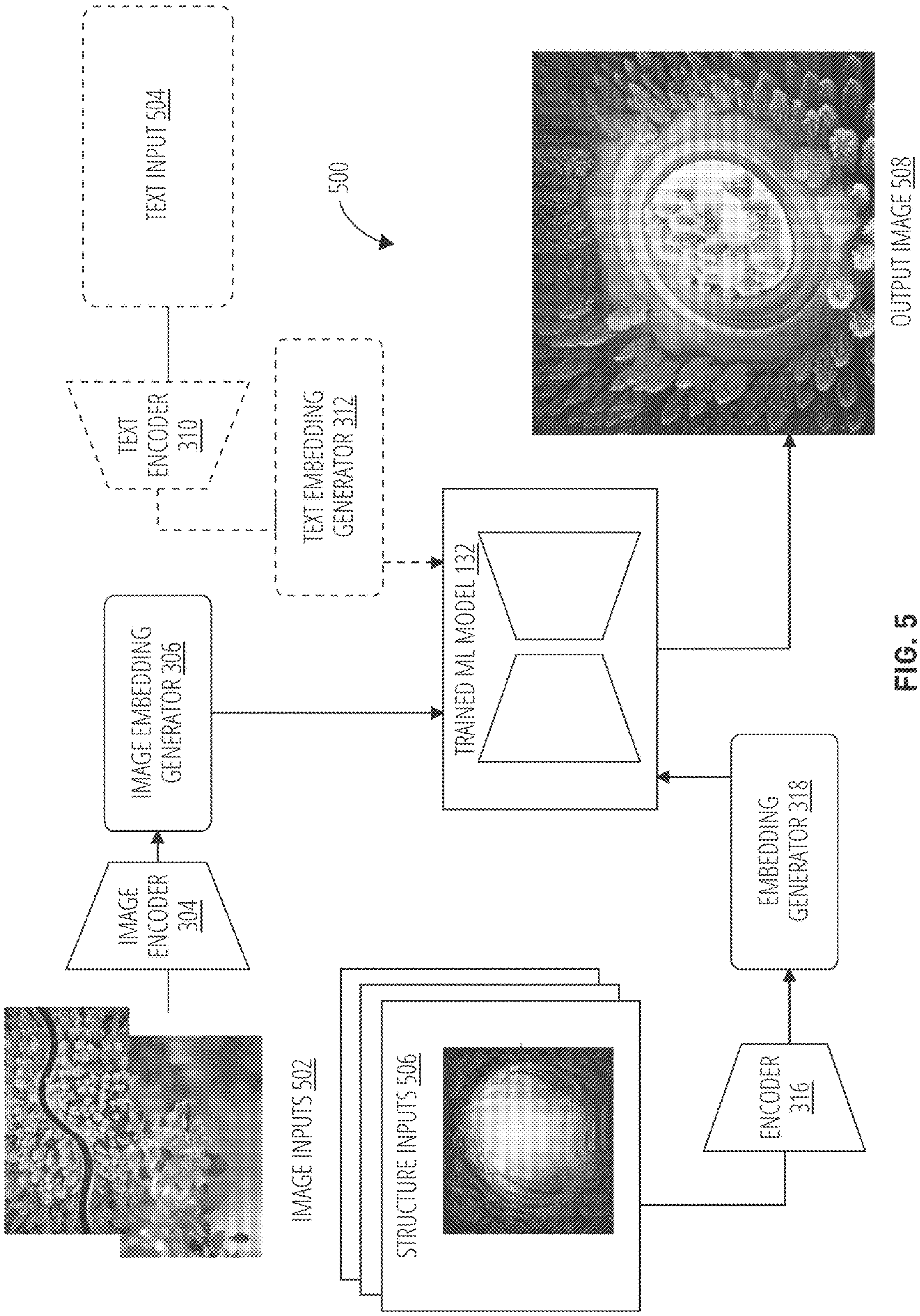
FIG. 5 illustrates yet another example inferencing system for generation of one or more images, according to some embodiments of the current subject matter.

Once the ML model 122 has been sufficiently trained (e.g., after three hundred thousand iterations using different embeddings generated by respective encoders 204, 210, and/or 216), the ML model becomes a trained ML model 132. The system 100 then uses the trained ML model 132 to generate one or more output images 134 based on one or more input conditions or modalities 126 during inference phase 104, as shown in FIG. 1. FIGS. 3-5 illustrate examples of operation of system 100 during inference phase 104.

FIG. 3 illustrates an example inferencing system 300 for generation of one or more images, according to some embodiments of the current subject matter. The system 300, which is part of the inference phase 104 in the system 100, implements the trained ML model 132 that has been trained using system 200 shown in FIG. 2 to produce an output image 322 (shown as output image 134 in FIG. 1). The system 300 also includes an image encoder 304 along with an image embedding generator 306, a text encoder 310 along with a text embedding generator 312, and one or more other encoders 316 along with corresponding embedding generators 318. The encoders can be similar to the encoders encoder(s) 128 in the system 100 and the generators can be similar to generators 130 in the system 100. One or more of the encoders (e.g., encoder 316) can be optional and/or not used during generation of images.

In some embodiments, the system 300 uses multiple images (which may be akin to image crops used during training of the system 200) as the image inputs 302 along with text inputs 308 to generate the output image 322 that combines various aspects of the images in the image inputs 302 with structure defined by the textual guidance in the text input 308. For example, the image inputs 302, as shown in FIG. 3, contain five images that include an image of a man, an image of a space suit, two landscape images, and a texture image. The text input 308 states "man sitting on a speedboat". This text input defines a specific structure that is desired to be shown in the output image 322. The image encoder 304 uses the images to generate image embeddings (similar to the way the image crops are processed by the encoder 216 in the system 200) and the image embedding generator 306 provides the image embeddings to the trained ML model 132. Similarly, the text encoder 310 processes text input 308 to generate one or more text embeddings (similar to the way the text is processed by the text encoder 210 in the system 200) and the text embedding generator 312 provides the text embeddings to the trained ML model 132. Using the embeddings resulting from text input 308, the trained ML model 132 queries the database(s) 136 (as shown in FIG. 1) to retrieve an image of a speedboat so that it can be incorporated into the output image 322.

In some embodiments, the system 300 can, optionally, receive one or more concept inputs 314 (e.g., defining background settings that are desired to be seen in output image 322, identifying various structural features for the output image 322, etc.). The concept inputs 314 can be in the form text inputs, image inputs, and/or any other type of inputs and/or any combination thereof. The encoder 316 processes the concept inputs 314 and the embedding generator 318 provides the concept embeddings to the trained ML model 132.

The trained ML model 132 ingests the image embeddings produced by the image encoder 304, the text embeddings produced by text encoder 310, and/or the concept embeddings produced the encoder 316 and generates the output image 322 (or output image 134 as shown in FIG. 1). Generation of the output image 322 is similar to the way output image 124 is generated by the system 200 during training phase 102. In some example, non-limiting embodiments, during generation of the output image 322, the system 200 can assign one or more random values to one or more text embeddings, one or more image embeddings, and/or one or more concept embeddings. This may allow the trained ML model 132 to ignore one or more of such embeddings when generating output image 322. Alternatively, or in addition, the system 200 can be configured to assign a specific number of tokens that are being supplied to the trained ML model 132, which causes the system 200 to assign a zero vector to one or more embeddings (e.g., image embeddings) in the event that less than the predetermined number of inputs is being supplied (e.g., less than five images).

In some embodiments, the system 200 can increase and/or decrease dominance of one or more inputs, e.g., image inputs, text inputs, concept inputs, etc. For example, the user may wish to see more representation of the texture in the output image 322. To do so, the system 200 assigns one or more weights to one or more embeddings generated by the respective encoders 304, 310, and/or 316. Assignment of weights can be accomplished via user inputs to the system and/or randomly. Once the weights are assigned, the system 200 multiplies the values associated with corresponding embeddings by the assigned weight. For example, if the user wants to increase the dominance of the texture image by 50%, the system 200 multiplies its image embedding using a weight value of 1.5 to generate output image 322 that will have an enhanced presence of the texture supplied in the original image. As can be understood, any other ways of affecting the output image 322 are possible.

FIG. 4 illustrates another example inferencing system 400 for generation of one or more images, according to some embodiments of the current subject matter. Similar to the system 300 shown in FIG. 3, the system 400, which is part of the inference phase 104 of the system 100, implements the trained ML model 132 that has been trained using system 200 shown in FIG. 2 to produce an output image 408. The system 400 also includes the image encoder 304 along with the image embedding generator 306, the text encoder 310 along with the text embedding generator 312, and one or more other encoders 316 along with corresponding embedding generators 318. In the system 400, the encoders 316 generate embeddings based on specific structure inputs 406 that affect generation of the output image 408.

Instead of multiple images (as in the system 300), the system 400 uses a single image as part of the image inputs 402. It also uses text inputs 404 and structure and/or concept inputs 406 (where the structure input and concept inputs may be separately and/or jointly provided to the encoder 316) to generate the output image 408, which combines the image (e.g., a bag) in the image inputs 402 with structural aspects defined by the textual guidance in the text input 404 and the structure inputs 406. For example, the text input 404 states "bag in jungle", which defines that the trained ML model 132 should place the bag (or another similar bag) shown in image inputs 402 in an environment that represents a jungle. To provide more context, the structure and/or concept inputs 406 state "bag in jungle, mystic, foggy" and "autumn leaves". These inputs further define how the trained ML model 132 should visually arrange elements of the inputs 402, 404, and 406.

The image encoder 304 uses the image in the image inputs 402 to generate image embeddings (similar to the way the image crops are processed by the encoder 204 in the system 200) and the image embedding generator 306 provides the image embeddings to the trained ML model 132. Similarly, the text encoder 310 processes text input 404 to generate one or more text embeddings and the text embedding generator 312 provides the text embeddings to the trained ML model 132. The encoder 316 processes the structure and/or concept inputs 406 (which, as can be understood, can be in the form text inputs, image inputs, and/or any other type of inputs and/or any combination thereof) to generate structure embeddings and the embedding generator 318 provides the structure embeddings to the trained ML model 132.

Similar to the system 300, the trained ML model 132 ingests the image embeddings produced by the image encoder 304, the text embeddings produced by text encoder 310, and/or the structure embeddings produced by the encoder 316 and generates the output image 322 (or output image 134 as shown in FIG. 1). In generating the output image 322, the structure and/or concept inputs defined by the text (i.e., "bag in jungle, mystic, foggy" and "autumn leaves") provides loose guidance and influences how the final output image 322 is setup. Moreover, the trained ML model 132 uses the structure guidance to add newer components. Using the embeddings resulting from text input 404 and/or the structure inputs 406, the trained ML model 132 queries the database(s) 136 (as shown in FIG. 1) to retrieve an image of a jungle, mystic background, fog, and autumn leaves and incorporates them into the output image 408.

In some example, non-limiting embodiments, the encoder 316 can be a prior model (as available from OpenAI, Inc., San Francisco, CA, USA) is a transformer-based diffusion model. It is used as a component to encode text into image embedding(s), which is in same space as the image embedding(s) generated using the CLIP image encoder. This allows the model 132 to use text as a substitute for the image conditions. During the inference phase, this enables the model 132 to add objects and/or scenes using the text inputs and treat them as if they were images. The prior model is a two-stage model that includes, for an image x, a prior $P(z_i|y)$ that generates one or more CLIP image embeddings, $z_i$ and $z_t$, based on a text instruction and/or input, y, and a decoder $P(x|z_i, y)$ that generates one or more images x conditioned on CLIP image embedding(s) $z_i$. The combination of the prior and the decoder produces a model P(x|y) of images x given using instructions/input y: $P(x|y)=P(x,z_i|y)=P(x|z_i,y)P(z_i|y)$. The true conditional distribution P(x|y) is sampled by sampling z using the prior and then sampling x using the decoder.

Thus, the use of the prior model allows globally guiding of how output image will appear through generation of image embeddings from text inputs and using them in place of image inputs. This allows disguising the image conditions with outputs from the prior model, which, in turn, enables providing of multi-text inputs that correspond to objects, concepts, etc., as shown in FIG. 4. Moreover, the prior model may be used to restrict generation of output images to certain domains, where, for example, the model 132 can be trained using certain types and/or styles of datasets (such as, for example, using generative AI).

In some example, non-limiting embodiments, more than one encoder 316 can be used for generation of embeddings 318. For example, in addition to the prior model encoder 316, another encoder—for example, an autoencoder model—can be used. The autoencoder model can be separate from the prior encoder model, where the prior encoder model and the autoencoder model can be configured to operate separately from one another. The models can also be configured to generate their own respective embeddings simultaneously, one after the other, and/or as desired. Moreover, the models can use each other's outputs as inputs. The autoencoder (e.g., AutoencoderKL, as described by Diederik P. Kingma and Max Welling) uses convolution layers to extract one or more latents of the entire image, which has an overall information of the structure and/or semantics of the image. The operation of the autoencoder is discussed herein with regard to FIG. 2 and can be similar to that of the image encoder 204.

As can be understood, the encoder 316 can be a single type encoder (e.g., a prior model, an autoencoder, etc.), an encoder configured to perform functions of different types of encoders, and/or multiple separate encoders (e.g., one encoder being prior model encoder and another encoder being an autoencoder and/or any other type of encoder). Embodiments are not limited to these examples.

FIG. 5 illustrates yet another example inferencing system 500 for generation of one or more images, according to some embodiments of the current subject matter. Similar to the systems 300 and 400 shown in FIGS. 3-4, respectively, the system 500, which, likewise, is part of the inference phase 104 of the system 100 shown in FIG. 1, implements the trained ML model 132 that has been trained using system 200 shown in FIG. 2 to produce an output image 508. The system 500 includes the image encoder 304 along with the image embedding generator 306, the text encoder 310 along with the text embedding generator 312, and one or more other encoders 316 along with corresponding embedding generators 318. In system 500, the text inputs 504 might be optional and/or not provided, and thus, the system 500, and in particular, the trained ML model 132, might not rely on any textual guidance to generate the output image 508. Instead, the system 500 uses the encoders 316 to generate embeddings based on specific conceptual structure inputs 506 that affect generation of the output image 508.

As shown in FIG. 5, the system 500 relies only on images to generate the output image 508. In this case, the encoders 304 and 316 may be autoencoders configured to process images. Here, the system 500 receives two images as image inputs 502, i.e., an image of a snowy forest as viewed from the sky and the image of flowers. The structure inputs 506 define a particular structure that is desired to be seen in the output image 508, i.e., a sunlit forest hollow. As stated above, any the encoders can be single and/or multiple encoder models that may be configured to operate separately from one another and/or jointly with one another. The encoders can be different types and/or can be configured to ingest any type of inputs. Embodiments are not limited to this context.

In generating output image 508, the system 500 can be configured (for example, as a result of inputs received from the user) to assign one or more weights to specific input modalities (e.g., to the image inputs 502 and/or to structure inputs 506). The weights affect influence of specific aspects of these inputs in the output image 508 generated by the trained ML model 132. For example, as shown in FIG. 5, the output image 508 arranges the snowy forest, from the first image in the image inputs 502, in a circular fashion similar to the sunlit forest hollow with flowers, from the second image in the image inputs 502, arranged sporadically around. Hence, the system 500 assigned a higher weight to the snowy forest image input 502 rather than to the flowers image input 502. Moreover, the system 500 assigned a higher weight to the sunlit forest hollow in the structure inputs 506.

Figure 6:
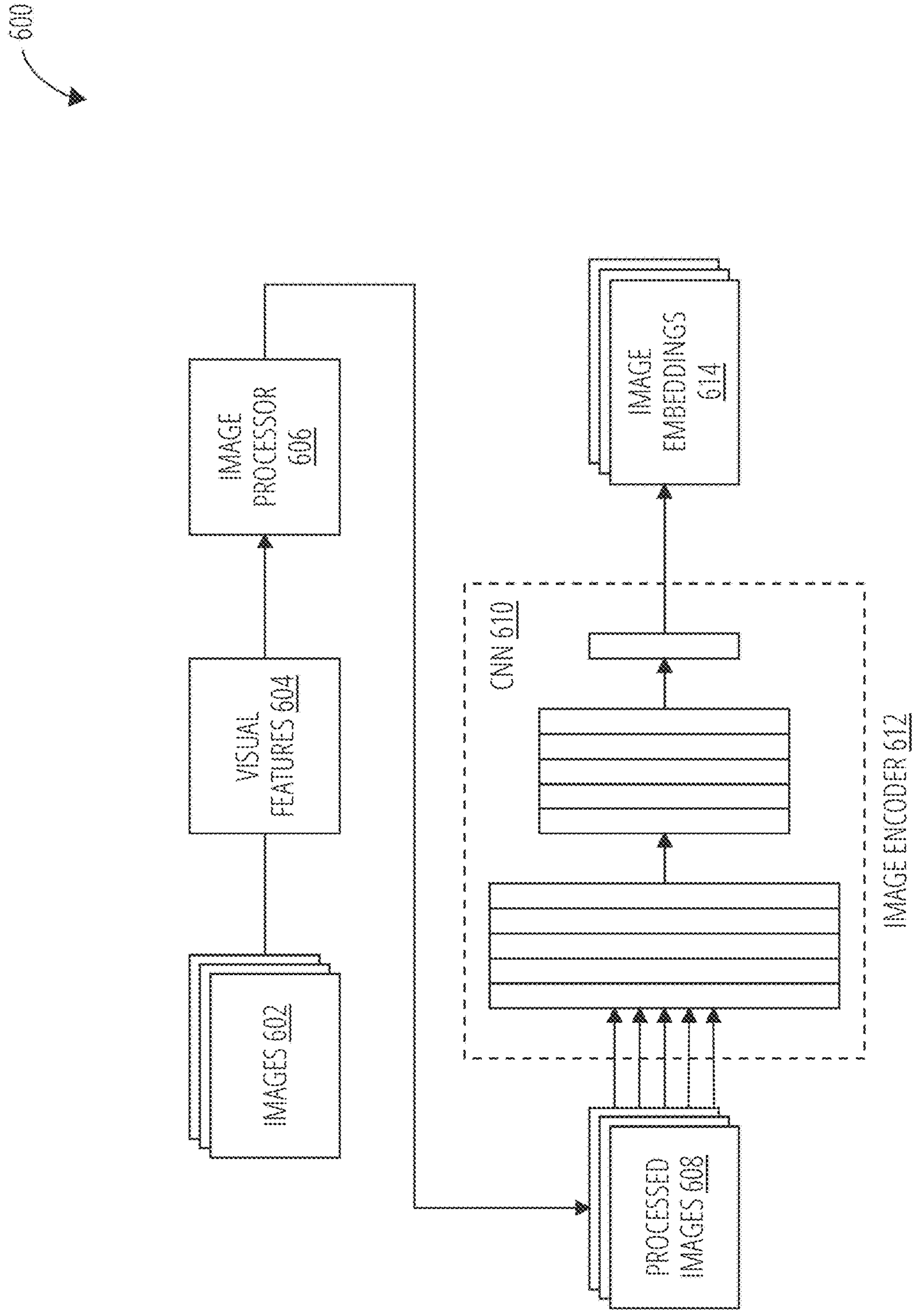
FIG. 6 illustrates an image pre-processing system suitable for implementation as part of the image generation system shown in FIG. 1.

FIG. 6 illustrates an image pre-processing system 600 suitable for implementation as part of the image generation system 100 shown in FIG. 1. The system 600 shows an example of image pre-processing, according to some embodiments of the current subject matter. In some embodiments, for example, the system 600 pre-processes the images 602 (e.g., images 106 and/or any images that are part of the input conditions 126 shown in FIG. 1) and provides them to the image encoder 612.

The system 600 receives as input one or more images 602. Examples of the images 602 include a still frame, a video frame or a video shot. Images 602 can be provided by the user and/or retrieved from the database(s) 136 (as show in FIG. 1). An image processor 606 optionally processes the images 602 to scale the images 602 to a standard size and/or format to match any input dimensions of one or more components of the system 100 (e.g., trained ML model 132).

The system 600 selects one or more visual features 604 from one or more of the images 602. Examples of the visual features 604 include the image features, as for example, shown in FIGS. 2-5. Other examples of visual features 604 include colors present in an image (e.g., a red apple versus a green apple), a texture of an object or surface in an image (e.g., a rough texture of a tree bark or a smooth texture of a metal surface), a shape of an object (e.g., a round ball or a rectangular box), edges of objects (e.g., sharp edges of a building or rounded edges of a cloud), patterns in an image (e.g., stripes on a zebra or mane of a lion), size of an object in an image (e.g., a small mouse or a larger rat), orientation of objects in an image (e.g., a vertical flagpole or a horizontal beam), and so forth. These are just a few examples of the many visual features that can be present in an image. The system 100 shown in FIG. 1 uses combinations of these and other visual features to recognize and classify objects in images, such as, for example, "man in the speedboat."

The image encoder 612 (and/or encoder 116) receives as input the processed images 608 and the visual features 604. The image encoder 612 passes the visual features 604 and the processed images 608 through a set of fully-connected convolutional layers of a CNN 610. The image encoder 612 generates image embeddings 614 (e.g., similar to the embeddings generated by encoders 112, 128 shown in FIG. 1) based on the processed images 608. In some cases, the image embeddings 614 include temporal information linking visual features to the temporal order of the images 602. For example, the image encoder 612 implements any type of encoders, such as, for example, but is not limited to, an autoencoder, a CLIP encoder, a PRIOR encoder, and/or any other types of encoders capable of processing images, and/or any combinations thereof.

Figure 7:
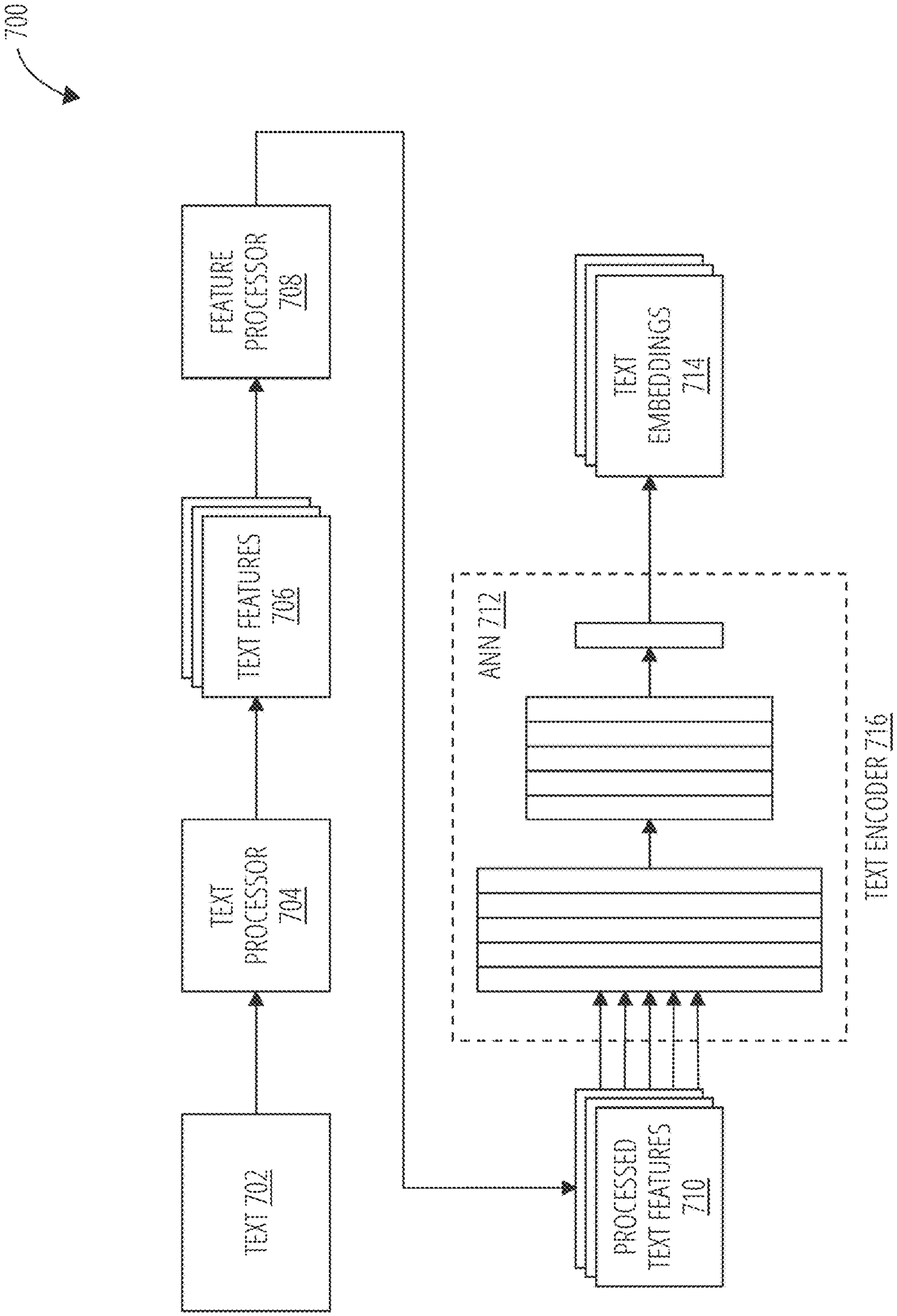
FIG. 7 illustrates a text pre-processing system suitable for implementation as part of the system shown in FIG. 1.

FIG. 7 illustrates a text pre-processing system 700 suitable for implementation as part of the system 100 shown in FIG. 1. The system 700 shows an example of text pre-processing, according to some embodiments of the current subject matter. In some embodiments, for example, the system 700 pre-processes the text 702 (e.g., text inputs that may be part of input conditions 126 shown in FIG. 1) and outputs text features to the text encoder 716 (e.g., similar to text encoder 118 and/or any encoder in the encoder(s) 128 capable of processing text inputs).

The system 700 receives as input a text 702. The text pre-processing system 700 implements a text processor 704 to pre-process raw natural language text from the text 702 in preparation for text feature extraction. Examples of some common pre-processing operations include tokenization which breaks the natural language text down into individual words or tokens, removing top words that are very common in language and do not carry much meaning (e.g., "a", "an", "the", "and", "of", "in", etc.), stemming or lemmatization to reduce words to their base form or root, removing special characters and digits from the text, vectorization to convert the text into a numerical format that can be used as input to the text encoder 716, and so forth. Vectorization is usually done using techniques such as bag-of-words or term frequency (TF) and inverse document frequency (IDF) (TD-IDF), which represent the text as a vector of word frequencies or weights.

The text pre-processing system 700 selects one or more text features 706 from the pre-processed text information from the text 702. Examples of text features 706 that are present in the text 702 include without limitation individual words, a sentence, a phrase, a paragraph, semantic information, context information, time information, a part of speech (e.g. noun, verb, adjective) of each word, a frequency of words, a length of sentences, use of punctuation marks (e.g., such as periods, commas, and exclamation points), use of capital letters in a word (e.g., a proper noun), spelling and grammar, and other text features from the text 702. These are just a few examples of the many text features that can be present in the text 702. A feature processor 708 optionally processes the text features 706 to scale the text features 706 to a standard size or format to match any input dimensions of the system 100, show in FIG. 1.

The text encoder 716 receives as input the processed text features 710. The text encoder 716 passes the processed text features 710 through an ANN 712. In one embodiment, the ANN 712 is a transformer-based neural network, such as, for example, generative pre-trained transformer (GPT), bidirectional encoder representations from transformers (BERT), and/or any other type of encoder. The transformer-based neural network is trained to encode natural language text into the text embeddings 714 that may be used by the ML model 122 and/or the trained ML model 132 shown in FIG. 1.

In various embodiments, the image encoder 612 and the text encoder 716 are modified, augmented or adapted versions of a pre-trained model, such as, for example, the contrastive language-image pre-training (CLIP) model. The CLIP model is a neural network architecture that can process both visual and textual features. In CLIP, the input to the CLIP text encoder is a sequence of token embeddings, where each token is mapped to a continuous vector representation using a pre-trained word embedding model such as global vectors (GloVe) or fastText. The CLIP model uses an attention mechanism that allows it to focus on different parts of the input text sequence during processing. Specifically, the CLIP text encoder uses a variant of the transformer architecture with multi-head self-attention, which allows it to attend to different parts of the input sequence in parallel. The CLIP text encoder is jointly trained with the CLIP image encoder that processes image features. This means that the CLIP model is trained to associate the text and image features with each other, allowing it to perform cross-modal tasks such as image captioning or image retrieval based on natural language queries. The CLIP model is trained using a contrastive learning approach, where it learns to distinguish between matching and non-matching pairs of text and image features. This encourages the model to learn semantically meaningful representations that capture the relationships between different modalities. The CLIP text encoder processes text features by first converting the text into a sequence of token embeddings, then applying a multi-head self-attention mechanism to capture dependencies between different parts of the input sequence. The CLIP text encoder is trained jointly with the CLIP image encoder using a contrastive learning approach, which encourages it to learn semantically meaningful representations of both text and image features.

Some embodiments implement fine-tuning techniques to modify, augment or adapt a pre-trained model such as the CLIP model to recognize new word embeddings. One embodiment, for example, modifies the CLIP model by changing an input space of the CLIP model. This provides better performance relative to techniques that change an output space of the CLIP model.

Figure 8:
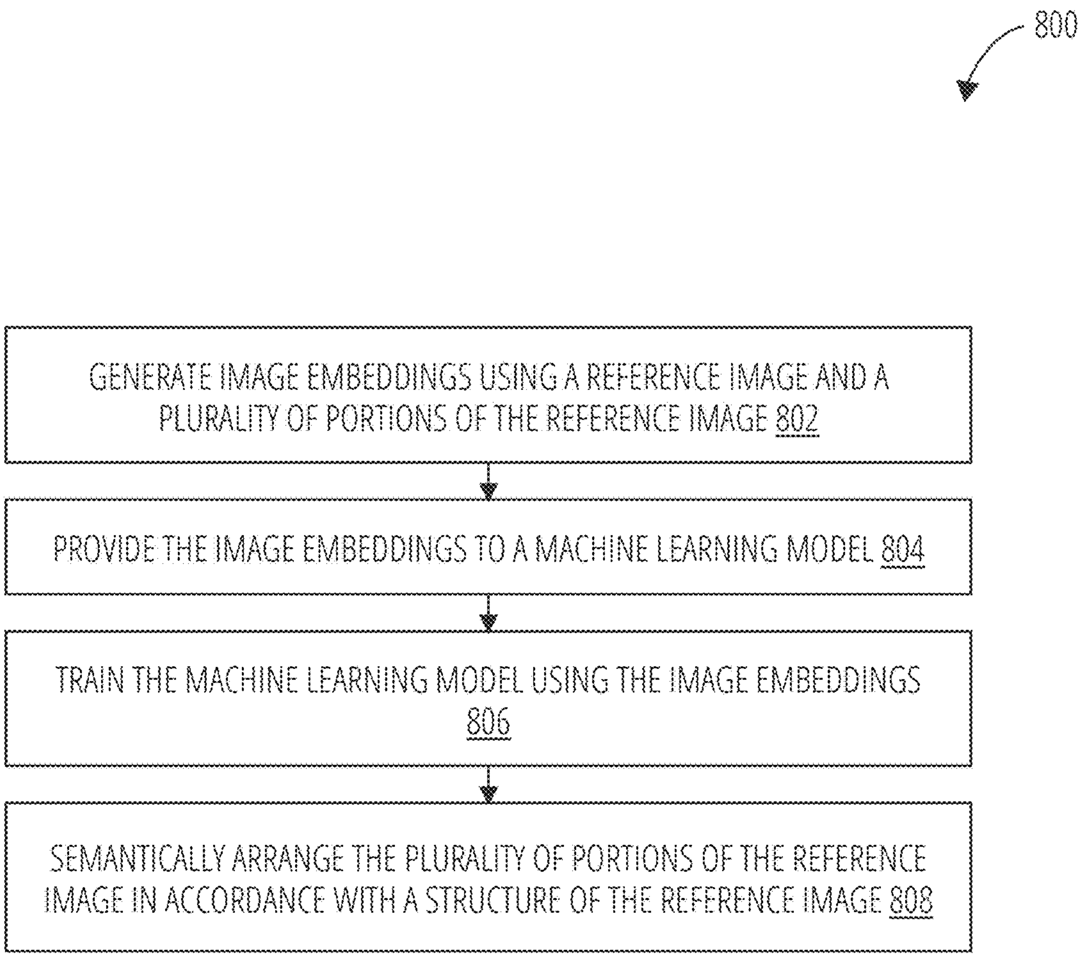
FIG. 8 illustrates an example process for training a machine learning model to generate one or more images based on one or more inputs, according to some embodiments of the current subject matter.

FIG. 8 illustrates an example process 800 for training a machine learning model, such as ML model 122, to generate one or more images based on one or more inputs, according to some embodiments of the current subject matter. The system 100, shown in FIG. 1, executes the process 800 during the training phase 102.

At 802, the system 100 generates one or more image embeddings using at least one reference image and a plurality of portions of the at least one reference image. For example, the system 100 receives a ground truth image 202 (as shown in FIG. 2) and provides the image 202 to the image encoder 204. The image encoder 204 generates one or more image embeddings that are provided by the image embedding generator 206 to the ML model 122 for training, at 804.

Further, the image crop generator 212 receives the ground truth image 202 and generates one or more image crops 214 based on the image 202. The image crops 214 can be randomly generated. The generator 212 can generate any number of image crops 214 (e.g., 5, 10, etc.). Further, each image crop 214 can have a different (or same) size. The image crop generator 212 randomly determines sizes of each image crop 214. Further, since the ML model 122 is iteratively trained, the generator 212 generates different image crops 214 for each training iteration of the ML model 122. The encoder 216 receives the image crops and generate image crop embeddings. The image crop embedding generator 218 provides the image crop embeddings to the ML model 122 for training.

Moreover, the text encoder 210 receives text inputs, if any, (e.g., text input 208) and generates text embeddings. The text embedding generator 220 provides the text embeddings to the ML model 122 for training. As can be understood, text inputs, while assistive in generating final output images, can be optional.

As stated above, the system 100 trains the ML model 122 over multiple iterations (e.g., 300 thousand iterations, one million iterations, etc.). For each iteration different, the system 100 generates different image embeddings, image crop embeddings, and/or text embeddings (if any). This way, the ML model 122 is trained to recognize specific inputs and generate output image 134 during the inference phase 104.

At 806, the system 100 trains the machine learning model 122 using at least the image embeddings (e.g., image embeddings, image crops embeddings). The training includes semantically arranging the plurality of portions of the reference image (e.g., image crops embeddings) in accordance with a structure of the reference image (i.e., ground truth image 202) so that ML model 122, once trained, outputs an output image 124.

Figure 9:
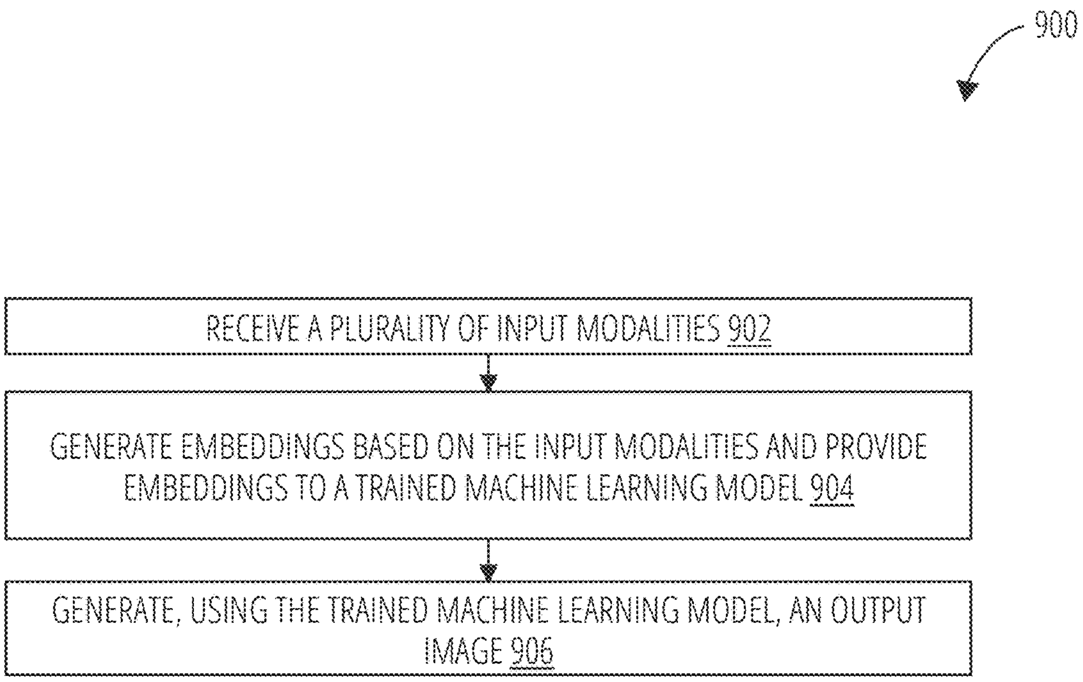
FIG. 9 illustrates an example process for generating an image by trained ML models based on one or more input modalities, according to some embodiments of the current subject matter.

FIG. 9 illustrates an example process 900 for generating an image by a trained ML models (e.g., trained ML model 132) based on one or more input modalities, according to some embodiments of the current subject matter. The system 100, shown in FIG. 1, executes the process 900 during the inference phase 104.

At 902, the system 100 receives a plurality of input conditions, such as for example, input conditions 126. The input conditions 126 include images (e.g., image inputs 302, 402, 502) and/or text (e.g., text input 308, text input 404, concept inputs 314, structure inputs 406, etc.). The inputs may specify how final output image (e.g., output image 322, 408, 508, etc.) should look like.

At 904, the system 100 generates one or more embeddings based on the input conditions. The encoders of the system 100 generate such embeddings. For example, the image encoder 304 (shown in FIG. 3) generates one or more image embeddings based on image inputs 302 (e.g., five images shown in FIG. 3). The separate image inputs 302 may be akin to image crops generated by the image crop generator 212 shown in FIG. 2. Thus, the image embeddings generated by the image encoder 304 may be similar to the image crops embeddings generated by the image crops encoder 216 shown in FIG. 2, which the trained ML model 132 has learned to recognize during the training phase 102. In particular, the trained ML model 132 has been trained using at least one reference image (e.g., ground truth image 202) and a plurality of portions (e.g., image crops 214) of the reference image, where the trained ML model 132 has been trained to semantically arrange the plurality of portions of the reference image in accordance with a structure of that image.

In some embodiments, the trained ML model 132 also learned to recognize embeddings from any other inputs, such as text input 308. Here, the encoder 310 receives the text input 308 (e.g., "man sitting on a speedboat") and generate text embeddings that are provided to the trained ML model 132. The additional inputs (e.g., text, structure, concept, etc.) provide an ability for the system 100 to influence the final output image 134, which the system 100 generates, at 906.

Figure 10:
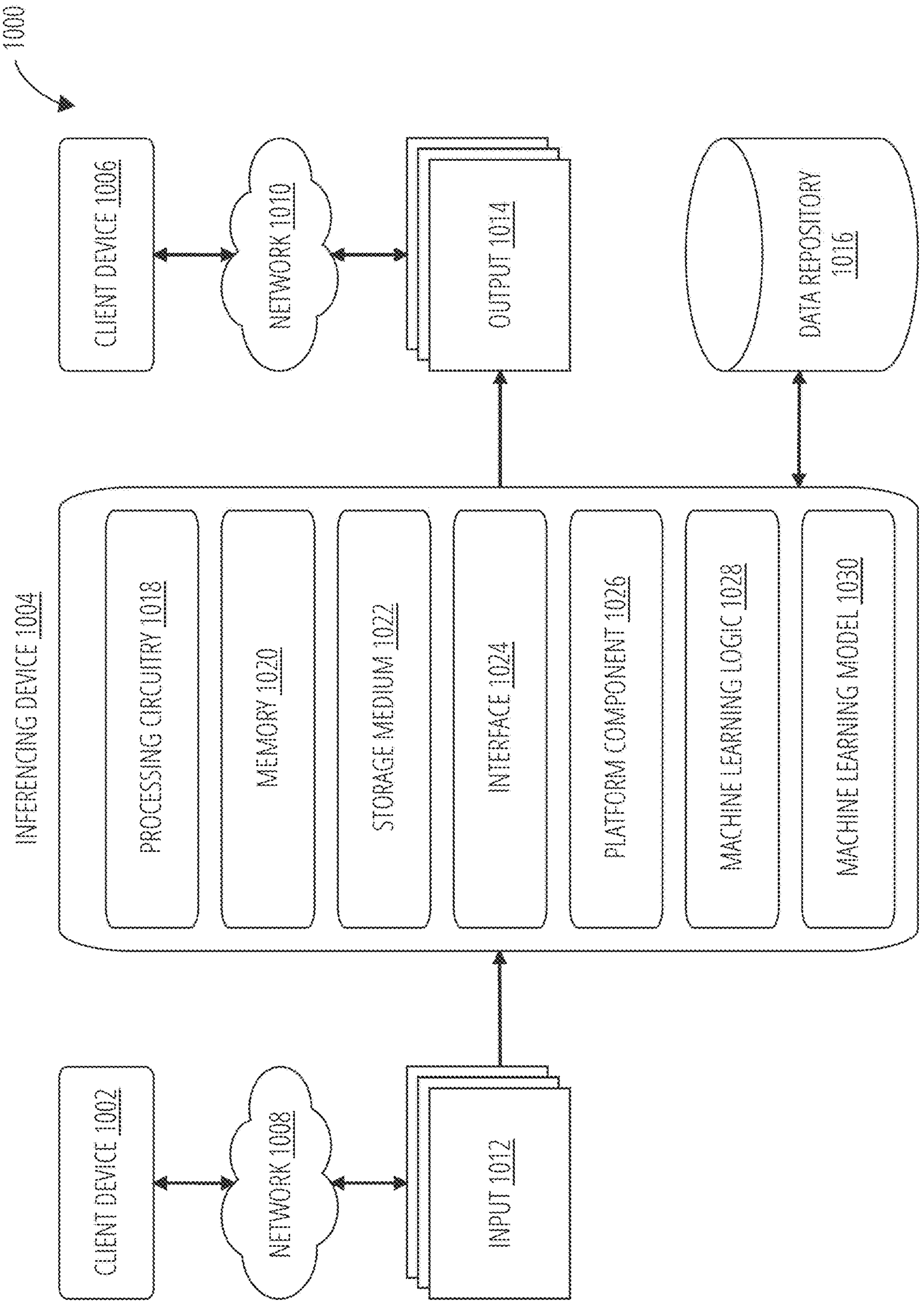
FIG. 10 illustrates a system, according to some embodiments of the current subject matter.

FIG. 10 illustrates an embodiment of a system 1000. The system 1000 is suitable for implementing one or more embodiments as described herein. In some embodiments, for example, the system 1000 is an AI/ML system suitable for performing training and image generation operations for the system 100.

The system 1000 comprises a set of M devices, where M is any positive integer. FIG. 10 depicts three devices (M=3), including a client device 1002, an inferencing device 1004, and a client device 1006. The inferencing device 1004 communicates information with the client device 1002 and the client device 1006 over a network 1008 and a network 1010, respectively. In some embodiments, for example, the inferencing device 1004 comprises a server device that implements the system 100. The client device 1002 and the client device 1006 are devices that implement a GUI interface, such as a web browser, to remotely access multimodal search services offered by the inferencing device 1004. In one embodiment, for example, the inferencing device 1004 is a client device 1002 or the client device 1006, such as a smartphone, tablet, laptop computer or desktop computer, that executes a GUI to directly interact with the system 100 executing locally on the inferencing device 1004.

The information includes input 1012 from the client device 1002 and output 1014 to the client device 1006, or vice-versa. An example of the input 1012 includes a ground truth image 202, image inputs 302, 402, 502, a text input 208, 308, etc. An example of the output 1014 is output image 124 and/or output image 134. In one alternative, the input 1012 and the output 1014 are communicated between the same client device 1002 or client device 1006. In another alternative, the input 1012 and the output 1014 are stored in a data repository 1016. In yet another alternative, the input 1012 and the output 1014 are communicated via a platform component 1026 of the inferencing device 1004, such as an input/output (I/O) device (e.g., a touchscreen, a microphone, a speaker, etc.).

Figure 15:
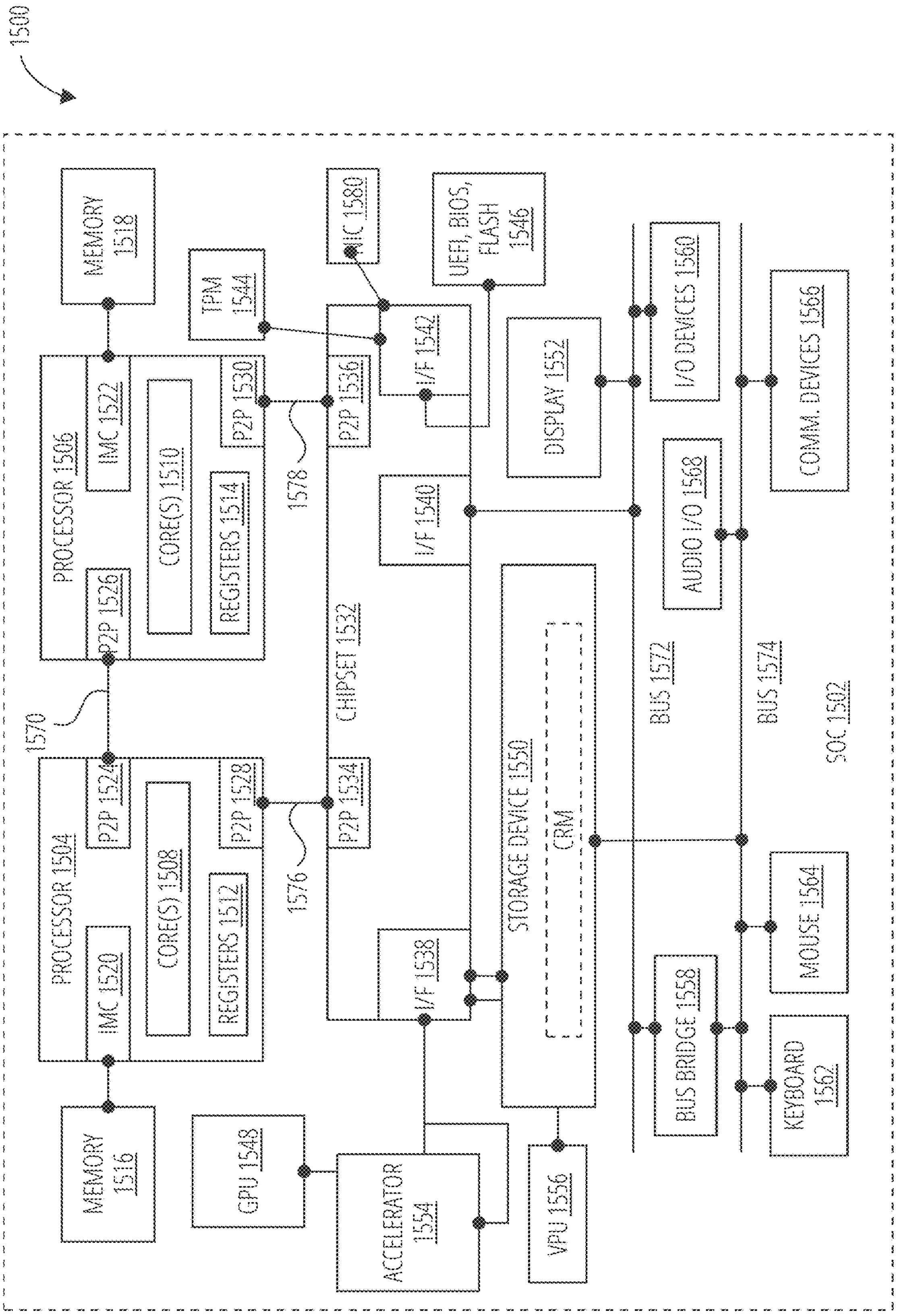
FIG. 15 illustrates a computing architecture, according to some embodiments of the current subject matter.

As depicted in FIG. 10, the inferencing device 1004 includes processing circuitry 1018, a memory 1020, a storage medium 1022, an interface 1024, a platform component 1026, ML logic 1028, and an ML model 1030. The ML logic 1028 executes operations to support the system 100. The ML model 1030 is the ML model 122 and/or trained ML model 132. In some implementations, the inferencing device 1004 includes other components or devices as well. Examples for software elements and hardware elements of the inferencing device 1004 are described in more detail with reference to a computing architecture 1500 as depicted in FIG. 15. Embodiments are not limited to these examples.

Figure 16:
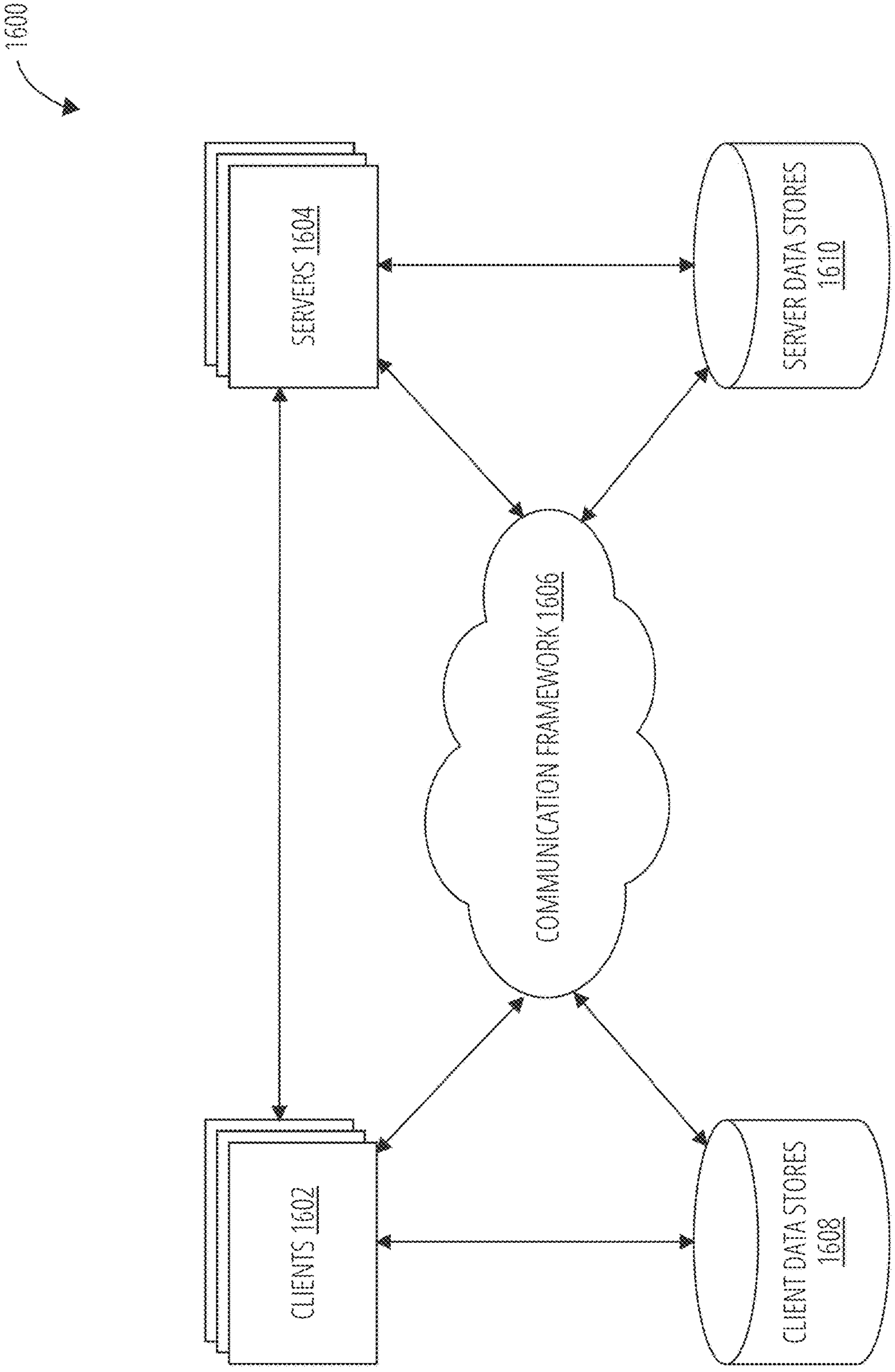
FIG. 16 illustrates a communications architecture, according to some embodiments of the current subject matter.

The inferencing device 1004 is generally arranged to receive an input 1012, process the input 1012 via one or more AI/ML techniques, and send an output 1014. The inferencing device 1004 receives the input 1012 from the client device 1002 via the network 1008, the client device 1006 via the network 1010, the platform component 1026 (e.g., a touchscreen as a text command or microphone as a voice command), the memory 1020, the storage medium 1022 or the data repository 1016. The inferencing device 1004 sends the output 1014 to the client device 1002 via the network 1008, the client device 1006 via the network 1010, the platform component 1026 (e.g., a touchscreen to present text, graphic or video information or speaker to reproduce audio information), the memory 1020, the storage medium 1022 or the data repository 1016. Examples for the software elements and hardware elements of the network 1008 and the network 1010 are described in more detail with reference to a communications architecture 1600 as depicted in FIG. 16. Embodiments are not limited to these examples.

The inferencing device 1004 includes ML logic 1028 and an ML model 1030 to implement various AI/ML techniques for various AI/ML tasks. The ML logic 1028 receives the input 1012, and processes the input 1012 using the ML model 1030. The ML model 1030 performs inferencing operations to generate an inference for a specific task from the input 1012. In some cases, the inference is part of the output 1014. The output 1014 is used by the client device 1002, the inferencing device 1004, or the client device 1006 to perform subsequent actions in response to the output 1014.

In various embodiments, the ML model 1030 is a trained ML model 1030 using a set of training operations. An example of training operations to train the ML model 1030 is described with reference to FIG. 11.

Figure 11:
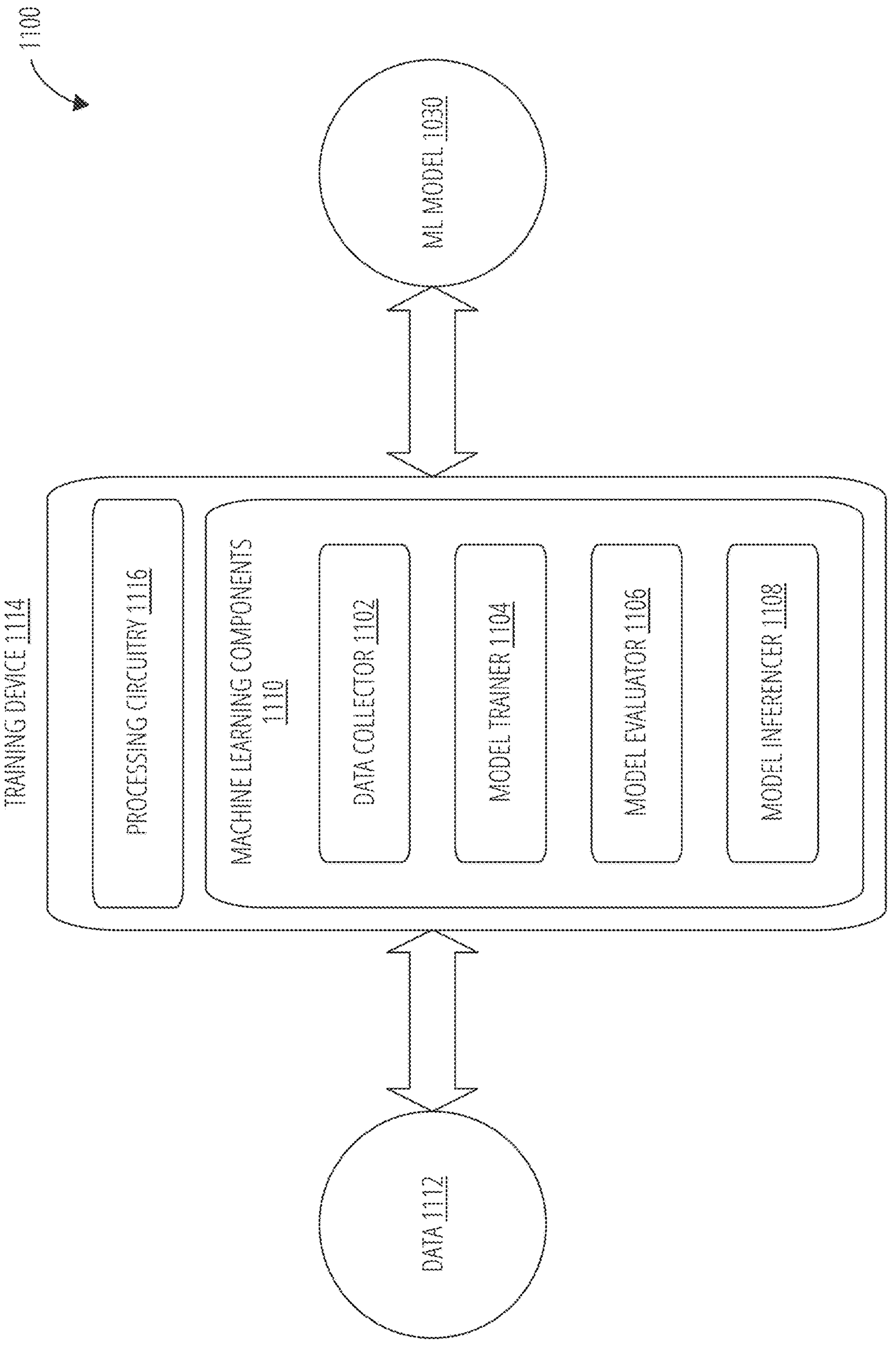
FIG. 11 illustrates an apparatus, according to some embodiments of the current subject matter.

FIG. 11 illustrates an apparatus 1100. The apparatus 1100 depicts a training device 1114 suitable to generate a trained ML model 1030 for the inferencing device 1004 of the system 1000. In some embodiments, the training device 1114 executes various ML components 1110 of the system 100 by training and executing the ML model 122 and/or trained ML model 132.

As depicted in FIG. 11, the training device 1114 includes a processing circuitry 1116 and a set of ML components 1110 to support various AI/ML techniques, such as a data collector 1102, a model trainer 1104, a model evaluator 1106 and a model inferencer 1108.

In general, the data collector 1102 collects data 1112 from one or more data sources to use as training data for the ML model 1030. The data collector 1102 collects different types of data 1112, such as text information, audio information, image information, video information, graphic information, and so forth. The model trainer 1104 receives as input the collected data and uses a portion of the collected data as test data for an AI/ML algorithm to train the ML model 1030. The model evaluator 1106 evaluates and improves the trained ML model 1030 using a portion of the collected data as test data to test the ML model 1030. The model evaluator 1106 also uses feedback information from the deployed ML model 1030. The model inferencer 1108 implements the trained ML model 1030 to receive as input new unseen data, generate one or more inferences on the new data, and output a result such as an alert, a recommendation or other post-solution activity.

An exemplary AI/ML architecture for the ML components 1110 is described in more detail with reference to FIG. 12.

Figure 12:
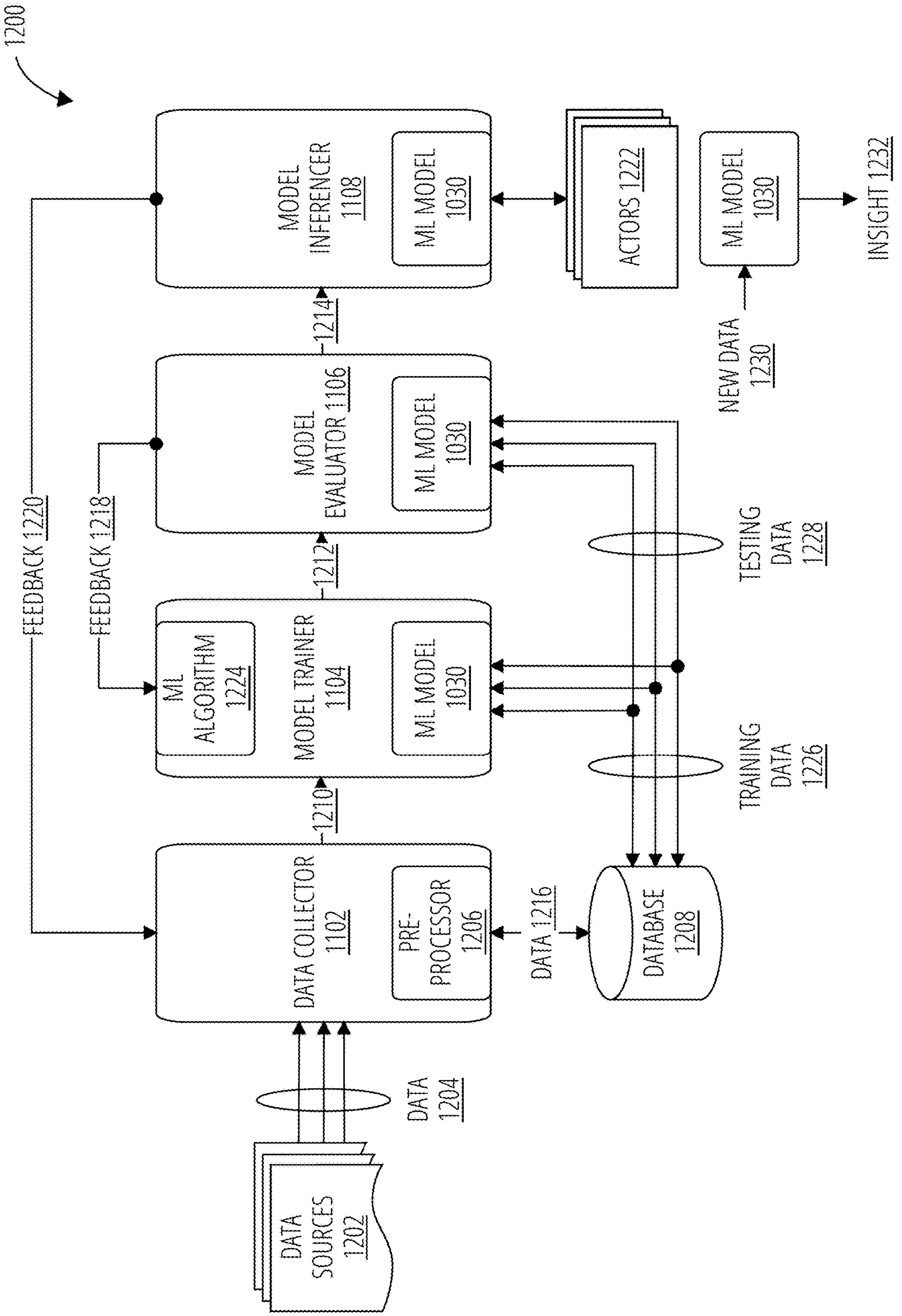
FIG. 12 illustrates an artificial intelligence architecture, according to some embodiments of the current subject matter.

FIG. 12 illustrates an artificial intelligence architecture 1200 suitable for use by the training device 1114 to generate the ML model 1030 for deployment by the inferencing device 1004. The artificial intelligence architecture 1200 is an example of a system suitable for implementing various AI techniques and/or ML techniques to perform various inferencing tasks on behalf of the various devices of the system 1000.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 1200 includes various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 1030, evaluate performance of the trained ML model 1030, and deploy the tested ML model 1030 as the trained ML model 1030 in a production environment, and continuously monitor and maintain it.

The ML model 1030 is a mathematical construct used to predict outcomes based on a set of input data. The ML model 1030 is trained using large volumes of training data 1226, and it can recognize patterns and trends in the training data 1226 to make accurate predictions. The ML model 1030 is derived from an ML algorithm 1224 (e.g., a neural network, decision tree, support vector machine, etc.). A data set is fed into the ML algorithm 1224 which trains an ML model 1030 to "learn" a function that produces mappings between a set of inputs and a set of outputs with a reasonably high accuracy. Given a sufficiently large enough set of inputs and outputs, the ML algorithm 1224 finds the function for a given task. This function may even be able to produce the correct output for input that it has not seen during training. A data scientist prepares the mappings, selects and tunes the ML algorithm 1224, and evaluates the resulting model performance. Once the ML logic 1028 is sufficiently accurate on test data, it can be deployed for production use.

The ML algorithm 1224 may comprise any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 1224 of the artificial intelligence architecture 1200 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 12, the artificial intelligence architecture 1200 includes a set of data sources 1202 to source data 1204 for the artificial intelligence architecture 1200. Data sources 1202 may comprise any device capable generating, processing, storing or managing data 1204 suitable for a ML system. Examples of data sources 1202 include without limitation databases, web scraping, sensors and Internet of Things (IoT) devices, image and video cameras, audio devices, text generators, publicly available databases, private databases, and many other data sources 1202. The data sources 1202 may be remote from the artificial intelligence architecture 1200 and accessed via a network, local to the artificial intelligence architecture 1200 an accessed via a network interface, or may be a combination of local and remote data sources 1202.

The data sources 1202 source difference types of data 1204. By way of example and not limitation, the data 1204 includes structured data from relational databases, such as customer profiles, transaction histories, or product inventories. The data 1204 includes unstructured data from websites such as customer reviews, news articles, social media posts, or product specifications. The data 1204 includes data from temperature sensors, motion detectors, and smart home appliances. The data 1204 includes image data from medical images, security footage, or satellite images. The data 1204 includes audio data from speech recognition, music recognition, or call centers. The data 1204 includes text data from emails, chat logs, customer feedback, news articles or social media posts. The data 1204 includes publicly available datasets such as those from government agencies, academic institutions, or research organizations. These are just a few examples of the many sources of data that can be used for ML systems. It is important to note that the quality and quantity of the data is critical for the success of a machine learning project.

The data 1204 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 1202 are communicatively coupled to a data collector 1102. The data collector 1102 gathers relevant data 1204 from the data sources 1202. Once collected, the data collector 1102 may use a pre-processor 1206 to make the data 1204 suitable for analysis. This involves data cleaning, transformation, and feature engineering. Data preprocessing is a critical step in ML as it directly impacts the accuracy and effectiveness of the ML model 1030. The pre-processor 1206 receives the data 1204 as input, processes the data 1204, and outputs pre-processed data 1216 for storage in a database 1208. Examples for the database 1208 includes a hard drive, solid state storage, and/or random-access memory (RAM).

The data collector 1102 is communicatively coupled to a model trainer 1104. The model trainer 1104 performs AI/ML model training, validation, and testing which may generate model performance metrics as part of the model testing procedure. The model trainer 1104 receives the pre-processed data 1216 as input 1210 or via the database 1208. The model trainer 1104 implements a suitable ML algorithm 1224 to train an ML model 1030 on a set of training data 1226 from the pre-processed data 1216. The training process involves feeding the pre-processed data 1216 into the ML algorithm 1224 to produce or optimize an ML model 1030. The training process adjusts its parameters until it achieves an initial level of satisfactory performance.

The model trainer 1104 is communicatively coupled to a model evaluator 1106. After an ML model 1030 is trained, the ML model 1030 needs to be evaluated to assess its performance. This is done using various metrics such as accuracy, precision, recall, and F1 score. The model trainer 1104 outputs the ML model 1030, which is received as input 1210 or from the database 1208. The model evaluator 1106 receives the ML model 1030 as input 1212, and it initiates an evaluation process to measure performance of the ML model 1030. The evaluation process includes providing feedback 1218 to the model trainer 1104. The model trainer 1104 re-trains the ML model 1030 to improve performance in an iterative manner.

The model evaluator 1106 is communicatively coupled to a model inferencer 1108. The model inferencer 1108 provides AI/ML model inference output (e.g., inferences, predictions or decisions). Once the ML model 1030 is trained and evaluated, it is deployed in a production environment where it is used to make predictions on new data. The model inferencer 1108 receives the evaluated ML model 1030 as input 1214. The model inferencer 1108 uses the evaluated ML model 1030 to produce insights or predictions on real data, which is deployed as a final production ML model 1030. The inference output of the ML model 1030 is use case specific. The model inferencer 1108 also performs model monitoring and maintenance, which involves continuously monitoring performance of the ML model 1030 in the production environment and making any necessary updates or modifications to maintain its accuracy and effectiveness. The model inferencer 1108 provides feedback 1218 to the data collector 1102 to train or re-train the ML model 1030. The feedback 1218 includes model performance feedback information, which is used for monitoring and improving performance of the ML model 1030.

Some or all of the model inferencer 1108 is implemented by various actors 1222 in the artificial intelligence architecture 1200, including the ML model 1030 of the inferencing device 1004, for example. The actors 1222 use the deployed ML model 1030 on new data to make inferences or predictions for a given task, and output an insight 1232. The actors 1222 implement the model inferencer 1108 locally, or remotely receives outputs from the model inferencer 1108 in a distributed computing manner. The actors 1222 trigger actions directed to other entities or to itself. The actors 1222 provide feedback 1220 to the data collector 1102 via the model inferencer 1108. The feedback 1220 comprise data needed to derive training data, inference data or to monitor the performance of the ML model 1030 and its impact to the network through updating of key performance indicators (KPIs) and performance counters.

As previously described with reference to FIGS. 1, 2, the systems 1000, 1100 implement some or all of the artificial intelligence architecture 1200 to support various use cases and solutions for various AI/ML tasks. In various embodiments, the training device 1114 of the apparatus 1100 uses the artificial intelligence architecture 1200 to generate and train the ML model 1030 for use by the inferencing device 1004 for the system 1000. In one embodiment, for example, the training device 1114 may train the ML model 1030 as a neural network, as described in more detail with reference to FIG. 13. Other use cases and solutions for AI/ML are possible as well, and embodiments are not limited in this context.

Figure 13:
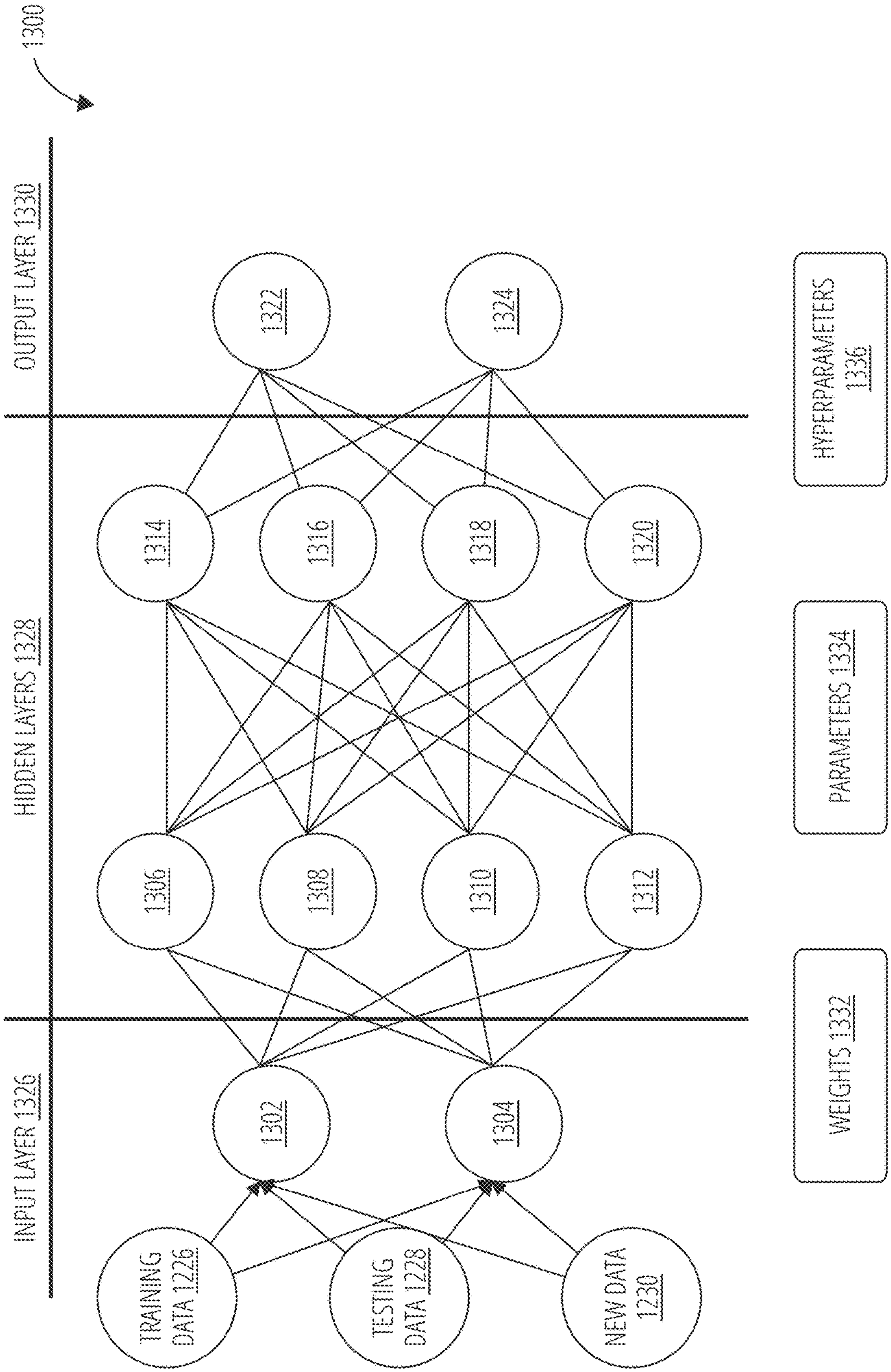
FIG. 13 illustrates an artificial neural network, according to some embodiments of the current subject matter.

FIG. 13 illustrates an embodiment of an artificial neural network 1300. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 1300 comprises multiple node layers, containing an input layer 1326, one or more hidden layers 1328, and an output layer 1330. Each layer comprises one or more nodes, such as nodes 1302 to 1324. As depicted in FIG. 13, for example, the input layer 1326 has nodes 1302, 1304. The artificial neural network 1300 has two hidden layers 1328, with a first hidden layer having nodes 1306, 1308, 1310 and 1312, and a second hidden layer having nodes 1314, 1316, 1318 and 1320. The artificial neural network 1300 has an output layer 1330 with nodes 1322, 1324. Each node 1302 to 1324 comprises a processing element (PE), or artificial neuron, that connects to another and has an associated weight and threshold. If the output of any individual node is above the specified threshold value, that node is activated, sending data to the next layer of the network. Otherwise, no data is passed along to the next layer of the network.

In general, artificial neural network 1300 relies on training data 1226 to learn and improve accuracy over time. However, once the artificial neural network 1300 is fine-tuned for accuracy, and tested on testing data 1228, the artificial neural network 1300 is ready to classify and cluster new data 1230 at a high velocity. Tasks in speech recognition or image recognition can take minutes versus hours when compared to the manual identification by human experts.

Each individual node 1302 to 424 is a linear regression model, composed of input data, weights, a bias (or threshold), and an output. Once an input layer 1326 is determined, a set of weights 1332 are assigned. The weights 1332 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 1300 as a feedforward network.

In one embodiment, the artificial neural network 1300 leverages sigmoid neurons, which are distinguished by having values between 0 and 1. Since the artificial neural network 1300 behaves similarly to a decision tree, cascading data from one node to another, having x values between 0 and 1 will reduce the impact of any given change of a single variable on the output of any given node, and subsequently, the output of the artificial neural network 1300.

The artificial neural network 1300 has many practical use cases, like image recognition, speech recognition, text recognition or classification. The artificial neural network 1300 leverages supervised learning, or labeled datasets, to train the algorithm. As the model is trained, its accuracy is measured using a cost (or loss) function. This is also commonly referred to as the mean squared error (MSE).

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 1334 of the model adjust to gradually converge at the minimum.

In one embodiment, the artificial neural network 1300 is feedforward, meaning it flows in one direction only, from input to output. In one embodiment, the artificial neural network 1300 uses backpropagation. Backpropagation is when the artificial neural network 1300 moves in the opposite direction from output to input. Backpropagation allows calculation and attribution of errors associated with each neuron 1302 to 1324, thereby allowing adjustment to fit the parameters 1334 of the ML model 1030 appropriately.

The artificial neural network 1300 is implemented as different neural networks depending on a given task. Neural networks are classified into different types, which are used for different purposes. In one embodiment, the artificial neural network 1300 is implemented as a feedforward neural network, or multi-layer perceptrons (MLPs), comprised of an input layer 1326, hidden layers 1328, and an output layer 1330. While these neural networks are also commonly referred to as MLPs, they are actually comprised of sigmoid neurons, not perceptrons, as most real-world problems are nonlinear. Trained data 1204 usually is fed into these models to train them, and they are the foundation for computer vision, natural language processing, and other neural networks. In one embodiment, the artificial neural network 1300 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 1300 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 1300 is implemented as any type of neural network suitable for a given operational task of system 1000, and the MLP, CNN, and RNN are merely a few examples. Embodiments are not limited in this context.

The artificial neural network 1300 includes a set of associated parameters 1334. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some cases, the artificial neural network 1300 is implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 1336. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

Figure 14:
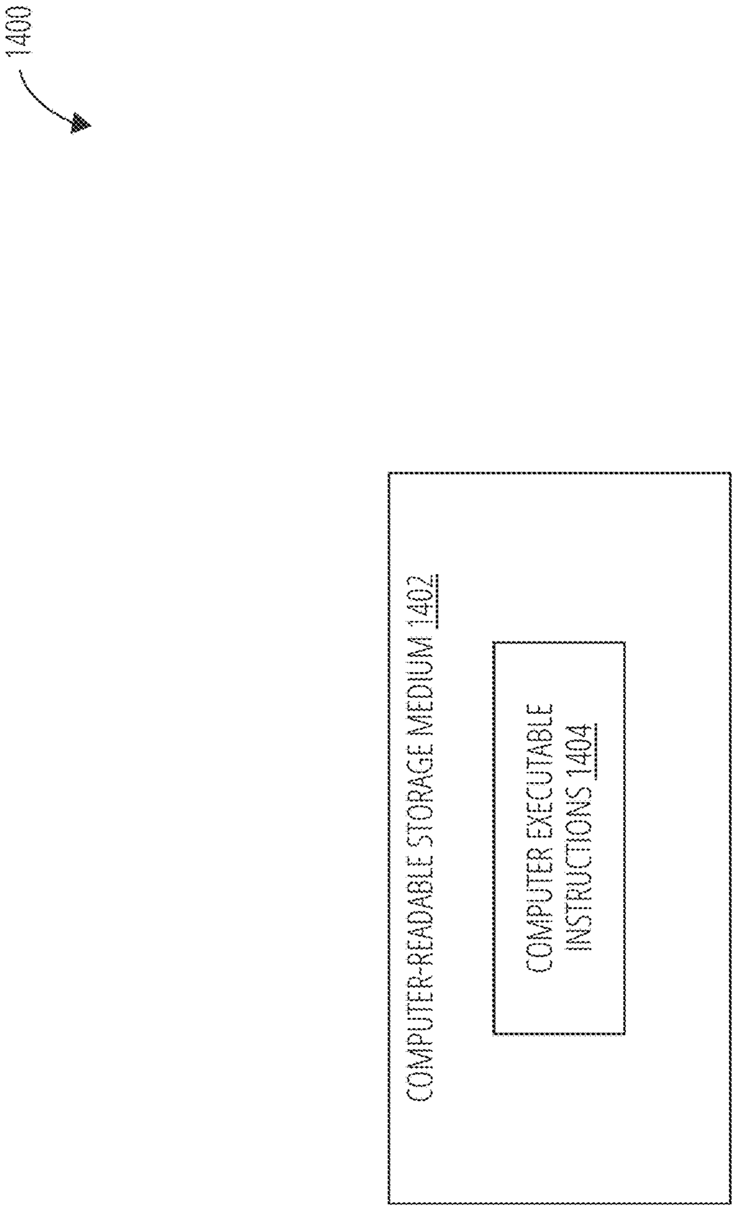
FIG. 14 illustrates a computer-readable storage medium, according to some embodiments of the current subject matter.

FIG. 14 illustrates an apparatus 1400. Apparatus 1400 comprises any non-transitory computer-readable storage medium 1402 or machine-readable storage medium, such as an optical, magnetic or semiconductor storage medium. In various embodiments, apparatus 1400 comprises an article of manufacture or a product. In some embodiments, the computer-readable storage medium 1402 stores computer executable instructions with which one or more processing devices or processing circuitry can execute. For example, computer executable instructions 1404 includes instructions to implement operations described with respect to any logic flows described herein. Examples of computer-readable storage medium 1402 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 1404 include any suitable type of code, such as source code, compiled code, interpreted code, executable code, static code, dynamic code, object-oriented code, visual code, and the like.

FIG. 15 illustrates an embodiment of a computing architecture 1500. Computing architecture 1500 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1500 has a single processor with one core or more than one processor. Note that the term "processor" refers to a processor with a single core or a processor package with multiple processor cores. In at least one embodiment, the computing architecture 1500 is representative of the components of the system 1000. More generally, the computing architecture 1500 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1500. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 15, computing architecture 1500 comprises a system-on-chip (SoC) 1502 for mounting platform components. System-on-chip (SoC) 1502 is a point-to-point (P2P) interconnect platform that includes a first processor 1504 and a second processor 1506 coupled via a point-to-point interconnect 1570 such as an Ultra Path Interconnect (UPI). In other embodiments, the computing architecture 1500 is another bus architecture, such as a multi-drop bus. Furthermore, each of processor 1504 and processor 1506 are processor packages with multiple processor cores including core(s) 1508 and core(s) 1510, respectively. While the computing architecture 1500 is an example of a two-socket (2S) platform, other embodiments include more than two sockets or one socket. For example, some embodiments include a four-socket (4S) platform or an eight-socket (8S) platform. Each socket is a mount for a processor and may have a socket identifier. Note that the term platform refers to a motherboard with certain components mounted such as the processor 1504 and chipset 1532. Some platforms include additional components, and some platforms include sockets to mount the processors and/or the chipset. Furthermore, some platforms do not have sockets (e.g., SoC, or the like). Although depicted as a SoC 1502, one or more of the components of the SoC 1502 are included in a single die package, a multi-chip module (MCM), a multi-die package, a chiplet, a bridge, and/or an interposer. Therefore, embodiments are not limited to a SoC.

The processor 1504 and processor 1506 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 1504 and/or processor 1506. Additionally, the processor 1504 need not be identical to processor 1506.

Processor 1504 includes an integrated memory controller (IMC) 1520 and point-to-point (P2P) interface 1524 and P2P interface 1528. Similarly, the processor 1506 includes an IMC 1522 as well as P2P interface 1526 and P2P interface 1530. IMC 1520 and IMC 1522 couple the processor 1504 and processor 1506, respectively, to respective memories (e.g., memory 1516 and memory 1518). Memory 1516 and memory 1518 are portions of the main memory (e.g., a dynamic random-access memory (DRAM)) for the platform such as double data rate type 4 (DDR4) or type 5 (DDR5) synchronous DRAM (SDRAM). In the present embodiment, the memory 1516 and the memory 1518 locally attach to the respective processors (i.e., processor 1504 and processor 1506). In other embodiments, the main memory couple with the processors via a bus and shared memory hub. Processor 1504 includes registers 1512 and processor 1506 includes registers 1514.

Computing architecture 1500 includes chipset 1532 coupled to processor 1504 and processor 1506. Furthermore, chipset 1532 are coupled to storage device 1550, for example, via an interface (I/F) 1538. The I/F 1538 may be, for example, a Peripheral Component Interconnect-enhanced (PCIe) interface, a Compute Express Link® (CXL) interface, or a Universal Chiplet Interconnect Express (UCIe) interface. Storage device 1550 stores instructions executable by circuitry of computing architecture 1500 (e.g., processor 1504, processor 1506, GPU 1548, accelerator 1554, vision processing unit 1556, or the like). For example, storage device 1550 can store instructions for the client device 1002, the client device 1006, the inferencing device 1004, the training device 1114, or the like.

Processor 1504 couples to the chipset 1532 via P2P interface 1528 and P2P 1534 while processor 1506 couples to the chipset 1532 via P2P interface 1530 and P2P 1536. Direct media interface (DMI) 1576 and DMI 1578 couple the P2P interface 1528 and the P2P 1534 and the P2P interface 1530 and P2P 1536, respectively. DMI 1576 and DMI 1578 is a high-speed interconnect that facilitates, e.g., eight Giga Transfers per second (GT/s) such as DMI 3.0. In other embodiments, the processor 1504 and processor 1506 interconnect via a bus.

The chipset 1532 comprises a controller hub such as a platform controller hub (PCH). The chipset 1532 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1532 comprises more than one controller hub such as a chipset with a memory controller hub, a graphics controller hub, and an input/output (I/O) controller hub.

In the depicted example, chipset 1532 couples with a trusted platform module (TPM) 1544 and UEFI, BIOS, FLASH circuitry 1546 via I/F 1542. The TPM 1544 is a dedicated microcontroller designed to secure hardware by integrating cryptographic keys into devices. The UEFI, BIOS, FLASH circuitry 1546 may provide pre-boot code. The I/F 1542 may also be coupled to a network interface circuit (NIC) 1580 for connections off-chip.

Furthermore, chipset 1532 includes the I/F 1538 to couple chipset 1532 with a high-performance graphics engine, such as, graphics processing circuitry or a graphics processing unit (GPU) 1548. In other embodiments, the computing architecture 1500 includes a flexible display interface (FDI) (not shown) between the processor 1504 and/or the processor 1506 and the chipset 1532. The FDI interconnects a graphics processor core in one or more of processor 1504 and/or processor 1506 with the chipset 1532.

The computing architecture 1500 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 1554 and/or vision processing unit 1556 are coupled to chipset 1532 via I/F 1538. The accelerator 1554 is representative of any type of accelerator device (e.g., a data streaming accelerator, cryptographic accelerator, cryptographic co-processor, an offload engine, etc.). One example of an accelerator 1554 is the Intel® Data Streaming Accelerator (DSA). The accelerator 1554 is a device including circuitry to accelerate copy operations, data encryption, hash value computation, data comparison operations (including comparison of data in memory 1516 and/or memory 1518), and/or data compression. Examples for the accelerator 1554 include a USB device, PCI device, PCIe device, CXL device, UCIe device, and/or an SPI device. The accelerator 1554 also includes circuitry arranged to execute machine learning (ML) related operations (e.g., training, inference, etc.) for ML models. Generally, the accelerator 1554 is specially designed to perform computationally intensive operations, such as hash value computations, comparison operations, cryptographic operations, and/or compression operations, in a manner that is more efficient than when performed by the processor 1504 or processor 1506. Because the load of the computing architecture 1500 includes hash value computations, comparison operations, cryptographic operations, and/or compression operations, the accelerator 1554 greatly increases performance of the computing architecture 1500 for these operations.

The accelerator 1554 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 1554. For example, the accelerator 1554 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1554 via a non-posted write (e.g., a deferred memory write (DMWr)). One example of an instruction that atomically submits a work descriptor to the shared work queue of the accelerator 1554 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1554. The dedicated work queue may accept job submissions via commands such as the movdir64b instruction.

Various I/O devices 1560 and display 1552 couple to the bus 1572, along with a bus bridge 1558 which couples the bus 1572 to a second bus 1574 and an I/F 1540 that connects the bus 1572 with the chipset 1532. In one embodiment, the second bus 1574 is a low pin count (LPC) bus. Various input/output (I/O) devices couple to the second bus 1574 including, for example, a keyboard 1562, a mouse 1564 and communication devices 1566.

Furthermore, an audio I/O 1568 couples to second bus 1574. Many of the I/O devices 1560 and communication devices 1566 reside on the system-on-chip (SoC) 1502 while the keyboard 1562 and the mouse 1564 are add-on peripherals. In other embodiments, some or all the I/O devices 1560 and communication devices 1566 are add-on peripherals and do not reside on the system-on-chip (SoC) 1502.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, power supplies, and so forth. The embodiments, however, are not limited to implementation by the communications architecture 1600.

As shown in FIG. 16, the communications architecture 1600 includes one or more clients 1602 and servers 1604. The clients 1602 and the servers 1604 are operatively connected to one or more respective client data stores 1608 and server data stores 1610 that can be employed to store information local to the respective clients 1602 and servers 1604, such as cookies and/or associated contextual information.

The clients 1602 and the servers 1604 communicate information between each other using a communication framework 1606. The communication framework 1606 implements any well-known communications techniques and protocols. The communication framework 1606 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1606 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/1000/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 1602 and the servers 1604. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Arca Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application, or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose, or it comprises a general-purpose computer as selectively activated or reconfigured by a computer program stored in the computer. The procedures presented herein are not inherently related to a particular computer or other apparatus. Various general-purpose machines are used with programs written in accordance with the teachings herein, or it proves convenient to construct more specialized apparatus to perform the required method steps. The required structure for a variety of these machines are apparent from the description given.

The following examples pertain to further embodiments, from which numerous permutations and configurations will be apparent.

In one aspect, a computer-implemented method may include receiving a plurality of input modalities comprising multiple images and a text input in a natural language; generating image embeddings for the multiple images and a text embedding for the text input; and generating an output image based on the image embeddings and the text embedding by a machine learning model, the output image comprising portions of the multiple images.

The method may also include wherein the machine learning model has been trained using a reference image and a plurality of portions of the reference image by semantically arranging the plurality of portions of the reference image in accordance with a structure of the reference image.

The method may also include wherein the plurality of input modalities includes at least one of: one or more images, one or more text inputs, and any combination thereof.

The method may also include wherein the image embeddings are generated based on the one or more images and one or more image portions embeddings generated based on one or more portions of the one or more images.

The method may also include further comprising converting the image embeddings and the one or more image portions embeddings to a uniform dimension.

The method may also include wherein the one or more portions of the one or more images include one or more randomly generated portions of the one or more images.

The method may also include wherein a size of each of the one or more portions of the one or more images is randomly determined.

The method may also include further comprising assigning one or more weights to each of the image embeddings and the text embedding, each weight in the one or more weights is associated with a probability of not using at least one of the image embeddings and the text embedding.

The method may also include wherein the machine learning model includes at least one of: a diffusion machine learning model, a generative machine learning model, and any combination thereof.

In one aspect, a computer-implemented method may include obtaining, using one or more processing devices, a training dataset comprising a reference image and a text prompt in a natural language; generating, using the one or more processing devices, image embeddings using the reference image and a plurality of portions of the reference image, and a text embedding for the text prompt; and training, using the one or more processing devices, a machine learning model using the image embeddings and the text embedding to semantically arrange the plurality of portions of the reference image in accordance with a structure of the reference image and the text prompt.

The method may also include wherein the image embeddings include a reference image embedding and one or more image portions embeddings, wherein the one or more image portions embeddings are generated using the reference image.

The method may also include wherein the training includes converting the reference image embedding and the one or more image portions embeddings to a uniform dimension.

The method may also include wherein the plurality of portions of the reference image includes one or more randomly generated portions of the reference image.

The method may also include wherein a size of each of the plurality of portions of the reference image is randomly determined.

The method may also include wherein the training includes assigning one or more weights to each of the one or more image embeddings and the text embedding, each weight in the one or more weights is associated with a probability of not using a respective one or more image embeddings and the text embedding during the training.

The method may also include wherein the machine learning model includes at least one of: a diffusion machine learning model, a generative machine learning model, and any combination thereof.

In one aspect, a non-transitory computer-readable medium storing executable instructions, which when executed by a processing device, cause the processing device to perform operations comprising: receiving a plurality of input modalities comprising multiple images and a text input in a natural language; generating image embeddings for the multiple images and a text embedding for the text input; and generating an output image based on the image embeddings and the text embedding by a machine learning model, the output image comprising portions of the multiple images.

The non-transitory computer-readable medium may also include wherein the plurality of input modalities include at least one of: one or more images, one or more text inputs, and any combination thereof; wherein the image embeddings are generated based on the one or more images and one or more image portions embeddings generated based on one or more portions of the one or more images; and one or more text embeddings generated based on the text input.

The non-transitory computer-readable medium may also include wherein the operations further comprise assigning one or more weights to each of the image embeddings and the text embedding, each weight in the one or more weights is associated with a probability of not using at least one of the image embeddings and the text embedding.

The non-transitory computer-readable medium may also include wherein the machine learning model includes at least one of: a diffusion machine learning model, a generative machine learning model, and any combination thereof.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What is claimed is:

1. A computer-implemented method, comprising:

receiving a plurality of input modalities including multiple images and a text input in a natural language;

generating image embeddings for the multiple images and a text embedding for the text input; and generating an output image based on the image embeddings and the text embedding by a machine learning model, the output image including semantically placed portions of the multiple images forming a single image.

2. The method of claim 1, wherein the machine learning model has been trained using a reference image and a plurality of portions of the reference image by semantically arranging the plurality of portions of the reference image in accordance with a structure of the reference image.

3. The method of claim 1, wherein the image embeddings are generated based on the multiple images and one or more image portions embeddings generated based on one or more portions of the multiple images.

4. The method of claim 3, further comprising converting the image embeddings and the one or more image portions embeddings to a uniform dimension.

5. The method of claim 3, wherein the one or more portions of the multiple images include one or more randomly generated portions of the multiple images.

6. The method of claim 5, wherein a size of each of the one or more portions of the multiple images is randomly determined.

7. The method of claim 1, further comprising assigning one or more weights to the image embeddings and the text embedding, each weight increasing or decreasing a dominance of one or more of the multiple images and the text input in the output image.

8. The method of claim 1, wherein the machine learning model includes at least one of: a diffusion machine learning model, a generative machine learning model, and any combination thereof.

9. The method of claim 1, further comprising:

receiving one or more additional input modalities including at least one of a concept input or a structure input; and generating one or more additional embeddings based on the one or more additional input modalities, wherein the output image is generated by the machine learning model further based on the one or more additional embeddings.

10. The method of claim 1, wherein the text input defines a structure for arrangement of the multiple images in the output image.

11. The method of claim 1, wherein the machine learning model queries one or more databases based on the text embedding to retrieve one or more images for incorporation into the output image.

12. A non-transitory computer-readable medium storing executable instructions, which when executed by a processing device, cause the processing device to perform operations comprising:

receiving a plurality of input modalities including multiple images and a text input in a natural language;

generating image embeddings for the multiple images and a text embedding for the text input; and generating an output image based on the image embeddings and the text embedding by a machine learning model, the output image including semantically placed portions of the multiple images forming a single image.

13. The non-transitory computer-readable medium of claim 12, wherein the image embeddings are generated based on the multiple images and one or more image portions embeddings generated based on one or more portions of the multiple images, and the text embedding is generated based on the text input.

14. The non-transitory computer-readable medium of claim 12, wherein the operations further comprise assigning one or more weights to the image embeddings and the text embedding, each weight increasing or decreasing a dominance of one or more of the multiple images and the text input in the output image.

15. The non-transitory computer-readable medium of claim 12, wherein the machine learning model includes at least one of: a diffusion machine learning model, a generative machine learning model, and any combination thereof.

16. A system comprising:

a memory component; and a processing device coupled to the memory component, the processing device to perform operations comprising:

receiving a plurality of input modalities including multiple images and a text input in a natural language;

generating image embeddings for the multiple images and a text embedding for the text input; and generating an output image based on the image embeddings and the text embedding by a machine learning model, the output image including semantically placed portions of the multiple images forming a single image.

17. The system of claim 16, wherein the machine learning model has been trained using a reference image and a plurality of portions of the reference image by semantically arranging the plurality of portions of the reference image in accordance with a structure of the reference image.

18. The system of claim 16, wherein the machine learning model includes at least one of: a diffusion machine learning model, a generative machine learning model, and any combination thereof.

19. The system of claim 16, wherein the operations further comprise assigning one or more weights to the image embeddings and the text embedding, each weight increasing or decreasing a dominance of one or more of the multiple images and the text input in the output image.

20. The non-transitory computer-readable medium of claim 12, wherein the operations further comprise:

receiving one or more additional input modalities including at least one of a concept input or a structure input; and generating one or more additional embeddings based on the one or more additional input modalities, wherein the output image is generated by the machine learning model further based on the one or more additional embeddings.

* * * * *